United States Patent
Gomi et al.

(10) Patent No.: US 9,302,388 B2
(45) Date of Patent: Apr. 5, 2016

(54) ROBOT

(71) Applicant: Seiko Epson Corporation, Tokyo (JP)

(72) Inventors: Akihiro Gomi, Fujimi-machi (JP);
Masaki Motoyoshi, Shiojiri (JP);
Shunsuke Toshimitsu, Azumino (JP)

(73) Assignee: Seiko Epson Corporation (JP)

( * ) Notice: Subject to any disclaimer, the term of this patent is extended or adjusted under 35 U.S.C. 154(b) by 78 days.

(21) Appl. No.: 14/013,334

(22) Filed: Aug. 29, 2013

(65) Prior Publication Data
US 2014/0067118 A1    Mar. 6, 2014

(30) Foreign Application Priority Data

Aug. 31, 2012  (JP) ................................. 2012-191451

(51) Int. Cl.
*B25J 9/16*        (2006.01)

(52) U.S. Cl.
CPC .............. *B25J 9/1651* (2013.01); *Y10S 901/09* (2013.01)

(58) Field of Classification Search
CPC ..... B25J 9/1651; Y10S 901/09; Y10S 901/10
USPC ............. 318/568.11, 568.16, 568.22, 568.23; 700/245, 250, 252, 253, 254, 258
See application file for complete search history.

(56) References Cited

U.S. PATENT DOCUMENTS

| 4,547,858 | A | * | 10/1985 | Horak .................... B25J 9/1648 318/568.11 |
| 4,906,907 | A | * | 3/1990 | Tsuchihashi ............... B25J 9/06 318/568.16 |
| 7,765,023 | B2 | | 7/2010 | Oaki |
| 2003/0178964 | A1 | * | 9/2003 | Challoner .............. B25J 9/1694 318/568.21 |
| 2007/0288124 | A1 | | 12/2007 | Nagata |
| 2012/0215357 | A1 | | 8/2012 | Igarashi |
| 2012/0215358 | A1 | | 8/2012 | Gettings |
| 2014/0067119 | A1 | * | 3/2014 | Gomi et al. ................... 700/253 |

FOREIGN PATENT DOCUMENTS

| JP | 10-100085 | 4/1998 |
| JP | 2005-242794 | 9/2005 |
| JP | 2011-042022 | 3/2011 |
| JP | 2012-171051 | 9/2012 |
| JP | 2012-171052 | 9/2012 |
| WO | 2006-022201 | 8/2005 |

* cited by examiner

*Primary Examiner* — Stephen Holwerda
(74) *Attorney, Agent, or Firm* — Harness, Dickey & Pierce, P.L.C.

(57) ABSTRACT

A robot includes a first arm that rotates around the first axis, a second arm that rotates around a second axis in a direction different from the first axis, a third arm that rotates around a third axis parallel to the second axis, a first inertia sensor that is installed at the first arm, a second (a) inertia sensor that is installed at the third arm, first to third angle sensors, a posture detection unit that detects the posture of the third arm with the second arm as a reference and derives a feedback gain, and a second drive source control unit that feeds back a second correction component, which is obtained by multiplying a value, which is obtained by subtracting the angular velocity $\omega A2m$ and the angular velocity $\omega A3m$ from the angular velocity $\omega A3$, by the feedback gain, and controls the second drive source.

9 Claims, 16 Drawing Sheets

ROBOT

BACKGROUND

1. Technical Field

The present invention relates to a robot.

2. Related Art

In the related art, a robot having a base and a plurality of arm link portions is known (for example, refer to JP-A-10-100085). Each arm link portion is rotatably coupled to the arm link portion on a base end side via a joint portion, and the arm link portion closest to the base side is rotatably coupled to the base via a joint portion.

In such a robot, the rigidity of the joint portion that couples the base and the arm link portion or the rigidity of the joint portion that couples the arm link portion and the arm link portion is low compared to the base or the arm link portions under the influence of spring elements of the joint portions. For the reason, there is a problem in that vibration may be easily generated in the arm link portions due to the rotation of the arm link portions or disturbance applied to the arm link portions.

Thus, in the robot described in JP-A-10-100085, an acceleration sensor is installed at a tip portion of the arm link portion closest to a tip side of the robot, compensation components of the respective joint portions that compensate command values to motors of the respective joint portions so as to suppress the vibration generated at the tip portion of the arm link portion closest to the tip side are calculated on the basis of the acceleration detected by the acceleration sensor, and the calculated compensation components of the respective joint portions are subtracted from the command values of the corresponding respective joint portions.

However, the robot described in JP-A-10-100085 has the following drawbacks.

First, since the acceleration sensor is installed at the tip portion of the arm link portion closest to the tip side, the acceleration detected by the acceleration sensor is converted and corrected into those for the respective joint portions. At this time, since it is necessary to perform coordinate axis transformation referred to as the Jacobi's transformation, and matrix calculation having a number of products of sine and cosine as factors is required, the amount of calculation becomes huge. Since it is necessary to calculate the factors according to the rotation angles of the motors of the respective joint portions that change every moment, it is always necessary to execute huge calculation. Accordingly, there is a drawback in that response speed becomes slow.

Additionally, since accurate acceleration or speed cannot be fed back if calculation precision declines, vibration suppression capability may decline or control performance may be impaired. For this reason, there is a restriction on the design of a control system in that a high-speed computing unit is required, for example.

Additionally, in the calculation of the coordinate axis transformation, there is a region (incalculable region) with no coordinate axis transformation solution referred to as a singular point. In the region, the vibration suppression capability may decline or vibration may be increased instead.

Additionally, for example, even when the posture of an arm link portion varies, such as when the arm link portion is extended and when the arm link portion is folded, the same control is performed. Thus, it is difficult to precisely suppress vibration while stabilizing control.

SUMMARY

An advantage of some aspects of the invention is to provide a robot that can easily and reliably suppress vibration in the robot according to the posture of an arm.

Application Example 1

A robot according to this application example includes a base; a first arm that is coupled to the base and rotates with a first rotation axis as an axial center; a second arm that is coupled to the first arm and rotates with a second rotation axis in a direction different from the first rotation axis as an axial center; a third arm that rotates with a third rotation axis in a direction parallel to the second rotation axis as an axial center; a first drive source that rotates the first arm through a first angular velocity command; a first inertia sensor that is installed at the first arm and detects the angular velocity or acceleration of the first rotation axis of the first arm; a first angle sensor that detects the rotation angle of the first drive source; a second drive source that rotates the second arm through a second angular velocity command; a second angle sensor that detects the rotation angle of the second drive source; a third drive source that rotates the third arm through a third angular velocity command; a second (a) inertia sensor that is installed at the third arm and detects the angular velocity or acceleration of the second rotation axis of the third arm; a third angle sensor that detects the rotation angle of the third drive source; a posture detection unit that detects the posture of the third arm with the second arm as a reference and derives a feedback gain; a first drive source control unit that feeds back a first correction component, which is derived from an angular velocity $\omega A1$ of the first rotation axis of the first arm obtained from the first inertia sensor and an angular velocity $\omega A1m$ of the first rotation axis of the first arm obtained from the first angle sensor, and controls the first drive source; and a second drive source control unit that feeds back a second correction component, which is obtained by multiplying a value, which is obtained by subtracting an angular velocity $\omega A2m$ of the second rotation axis of the second arm obtained from the second angle sensor and an angular velocity $\omega A3m$ of the third rotation axis of the third arm obtained from the third angle sensor from an angular velocity $\omega A3$ of the second rotation axis of the third arm obtained from the second (a) inertia sensor, or a value derived from the obtained value, by the feedback gain, and controls the second drive source.

Accordingly, the vibration in the robot can be more effectively and reliably suppressed by adjusting the feedback gain according to the posture of an arm.

That is, huge calculation is unnecessary, and thereby, response speed in the control of the robot can be increased. Additionally, since calculation in which a singular point is present is unnecessary, the control of the robot can be reliably performed, and vibration can be reliably suppressed.

Additionally, compared to a case where the inertia sensors are installed at the respective arms and the control of suppressing the vibration in each arm is performed on each arm, the number of the inertia sensors can be reduced, costs can be reduced, and circuit configuration can be simplified.

Additionally, since the second drive source control unit performs the control that feeds back the angular velocities $\omega A3$, $\omega A2m$, and $\omega A3m$ to control the second drive source, that is, suppresses vibration on the second drive source that rotates the second arm, using the detection result of the second (a) inertia sensor installed at the third arm on the tip side where a larger vibration than the second arm is generated, the effect of suppressing the vibration can be enhanced. Additionally, the effect of suppressing the vibration can be enhanced by controlling the second drive source that rotates the second arm closer to the base end side than the third arm.

Particularly, since the second drive source control unit adjusts the feedback gain in the feedback control according to the posture of the third arm with the second arm as a reference, vibration can be reliably and effectively suppressed according to the posture of the third arm.

Application Example 2

In the robot according to the application example, it is preferable that the robot further includes the first drive source control unit that feeds back the first correction component, which is obtained by multiplying a value, which is obtained by subtracting the angular velocity ωA1m from the angular velocity ωA1, or a value derived from the obtained value, by a feedback gain, and controls the first drive source.

Since the feedback gain is adjusted even in the first drive source control unit together with the second drive source control unit, the vibration in the robot can be more effectively suppressed.

Application Example 3

In the robot according to the application example, it is preferable that the robot further includes the posture detection unit that includes the third angle sensor and detects the angle θ formed between the axis of the second arm and the axis of the third arm.

Since the third angle sensor detects the angle θ formed between the axis of the second arm and the axis of the third arm, the number of parts can be reduced, configuration can be simplified, and the posture of the third arm can be more reliably detected.

Application Example 4

In the robot according to the application example, it is preferable that the robot further includes the posture detection unit that detects the angle θ formed between the axis of the second arm and the axis of the third arm, and increases the feedback gain as the angle θ approaches 180°.

Accordingly, vibration can be more reliably suppressed according to the posture of the third arm.

Application Example 5

In the robot according to the application example, it is preferable that the robot further includes the posture detection unit that adjusts the feedback gain, on the basis of the mass of an end effector or the mass of the end effector and an object to be gripped by the end effector.

Accordingly, the vibration can be reliably suppressed according to the mass.

Application Example 6

In robot according to the application example, it is preferable that the robot further includes the posture detection unit that decreases the feedback gain as the mass becomes larger.

Accordingly, the vibration can be more reliably suppressed according to the mass.

Application Example 7

A robot according to this application example includes a base; a first arm that is coupled to the base and rotates with a first rotation axis as an axial center; a second arm that is coupled to the first arm and rotates with a second rotation axis in a direction different from the first rotation axis as an axial center; a first drive source that rotates the first arm through a first angular velocity command; a first inertia sensor that is installed at the first arm and detects the angular velocity or acceleration of the first rotation axis of the first arm; a first angle sensor that detects the rotation angle of the first drive source; a second drive source that rotates the second arm through a second angular velocity command; a second angle sensor that detects the rotation angle of the second drive source; a second (b) inertia sensor that is installed at the second arm and detects the angular velocity or acceleration of the second rotation axis of the second arm; a posture detection unit that detects the posture of the second arm with the first arm as a reference and derives a feedback gain; a first drive source control unit that feeds back a first correction component, which is obtained by multiplying a value, which is obtained by subtracting an angular velocity ωA1m of the first rotation axis of the first arm obtained from a result of the first angle sensor from an angular velocity ωA1 of the first rotation axis of the first arm obtained from the first inertia sensor, or a value derived from the obtained value, by the feedback gain, and controls the first drive source; and a second drive source control unit that feeds back a second correction component, which is derived from an angular velocity ωA2 of the second rotation axis of the second arm obtained from the second (b) inertia sensor, and an angular velocity ωA2m of the second rotation axis of the second arm obtained from the second angle sensor, and controls the second drive source.

Accordingly, the vibration in the robot can be easily and reliably suppressed according to the posture of an arm.

That is, huge calculation is unnecessary, and thereby, response speed in the control of the robot can be increased. Additionally, since calculation in which a singular point is present is unnecessary, the control of the robot can be reliably performed, and vibration can be reliably suppressed.

Additionally, since the inertia sensors are installed at the respective arms and the control of suppressing the vibration in each arm is performed on the respective arms, the vibration in the robot can be more reliably suppressed.

Particularly, since the first drive source control unit adjusts the feedback gain in the feedback control according to the posture of the second arm with respect to the first arm, vibration can be reliably suppressed according to the posture of the second arm.

Application Example 8

In the robot according to the application example, it is preferable that the robot further includes the second drive source control unit that feeds back the second correction component, which is obtained by multiplying a value, which is obtained by subtracting the angular velocity ωA2m from the angular velocity ωA2, or a value derived from the obtained value, by a feedback gain, and controls the second drive source.

Since the feedback gain is adjusted even in the second drive source control unit together with the first drive source control unit, the vibration in the robot can be more effectively suppressed.

Application Example 9

In the robot according to the application example, it is preferable that the robot further includes the posture detection unit that includes the second angle sensor and detects the angle θ formed between the axis of the first arm and the axis of the second arm.

Since the second angle sensor detects the angle θ formed between the axis of the first arm and the axis of the second arm, the number of parts can be reduced, configuration can be simplified, and the posture of the second arm can be more reliably detected.

Application Example 10

In the robot according to the application example, it is preferable that the robot further includes the posture detection unit that detects the angle θ formed between the axis of the first arm and the axis of the second arm and that increases the feedback gain as the angle θ approaches 90° within a range in which the angle θ is equal to or larger than 0° and smaller than 180° or increases the feedback gain as the angle θ approaches 270° within a range in which the angle θ is equal to or larger than 180° and smaller than 360°.

Accordingly, vibration can be more reliably suppressed according to the posture of the second arm.

Application Example 11

In the robot according to the application example, it is preferable that the robot further includes the posture detection unit that adjusts the feedback gain, on the basis of the mass of an end effector or the mass of the end effector and an object to be gripped by the end effector.

Accordingly, the vibration can be reliably suppressed according to the mass.

Application Example 12

In the robot according to the application example, it is preferable that the robot further includes the posture detection unit that increases the feedback gain as the mass becomes larger.

Accordingly, the vibration can be more reliably suppressed according to the mass.

Application Example 13

In the robot according to the application example, it is preferable that the robot further includes a third arm that is coupled to the second arm so as to be rotatable with a third rotation axis parallel to the second rotation axis as an axial center; a third drive source that rotates the third arm; a third inertia sensor that is installed at the third arm and detects the angular velocity or acceleration of the second rotation axis of the third arm; a third angle sensor that detects the rotation angle of the third drive source; and a third drive source control unit that feeds back a third correction component, which is derived from an angular velocity ωA3 of the second rotation axis of the third arm obtained from the third inertia sensor, an angular velocity ωA2 of the second rotation axis of the second arm obtained from the second (b) inertia sensor, and an angular velocity ωA3m of the third rotation axis of the third arm obtained from the third angle sensor, and controls the third drive source.

Accordingly, the vibration in the robot can be more reliably suppressed.

Application Example 14

In the robot according to the application example, it is preferable that the robot further includes the third drive source control unit that feeds back the third correction component, which is obtained by multiplying a value, which is obtained by subtracting the angular velocity ωA2 and the angular velocity ωA3m from the angular velocity ωA3, or a value derived from the obtained value, by a feedback gain, and controls the third drive source.

Accordingly, the vibration in the robot can be more reliably suppressed.

Application Example 15

In the robot according to the application example, it is preferable that the robot further includes the first inertia sensor installed at a tip portion of the first arm; and the second (b) inertia sensor installed at a tip portion of the second arm.

Accordingly, since the first inertia sensor detects the angular velocity or acceleration of the first arm in a region where the vibration in the first arm is at the maximum and the second (b) inertia sensor detects the angular velocity or acceleration of the second arm in a region where the vibration in the second arm is at the maximum, the vibration in the robot can be more reliably suppressed.

Application Example 16

In the robot according to the application example, it is preferable that the robot further includes the first inertia sensor installed at a tip portion of the first arm; and the second (a) inertia sensor installed at a tip portion of the third arm.

Accordingly, since the first inertia sensor detects the angular velocity or acceleration of the first arm in a region where the vibration in the first arm is at the maximum and the second (a) inertia sensor detects the angular velocity or acceleration of the third arm in a region where the vibration in the third arm is at the maximum, the vibration in the robot can be more reliably suppressed.

Application Example 17

In the robot according to the application example, it is preferable that the robot further includes the first arm that rotates with the first rotation axis, which coincides with the normal line of an installation surface of the base, as an axial center.

Accordingly, the control of the robot can be easily performed.

Application Example 18

In the robot according to the application example, preferably, the robot further includes the second arm that rotates with the second rotation axis, which is orthogonal to the first rotation axis or parallel to an axis orthogonal to the first rotation axis, as an axial center.

Accordingly, the robot can be easily controlled.

BRIEF DESCRIPTION OF THE DRAWINGS

The invention will be described with reference to the accompanying drawings, wherein like numbers reference like elements.

DESCRIPTION OF EXEMPLARY EMBODIMENTS

A robot of the invention will be described below in detail on the basis of preferred embodiments shown in the accompanying drawings.

First Embodiment

Figure 1:
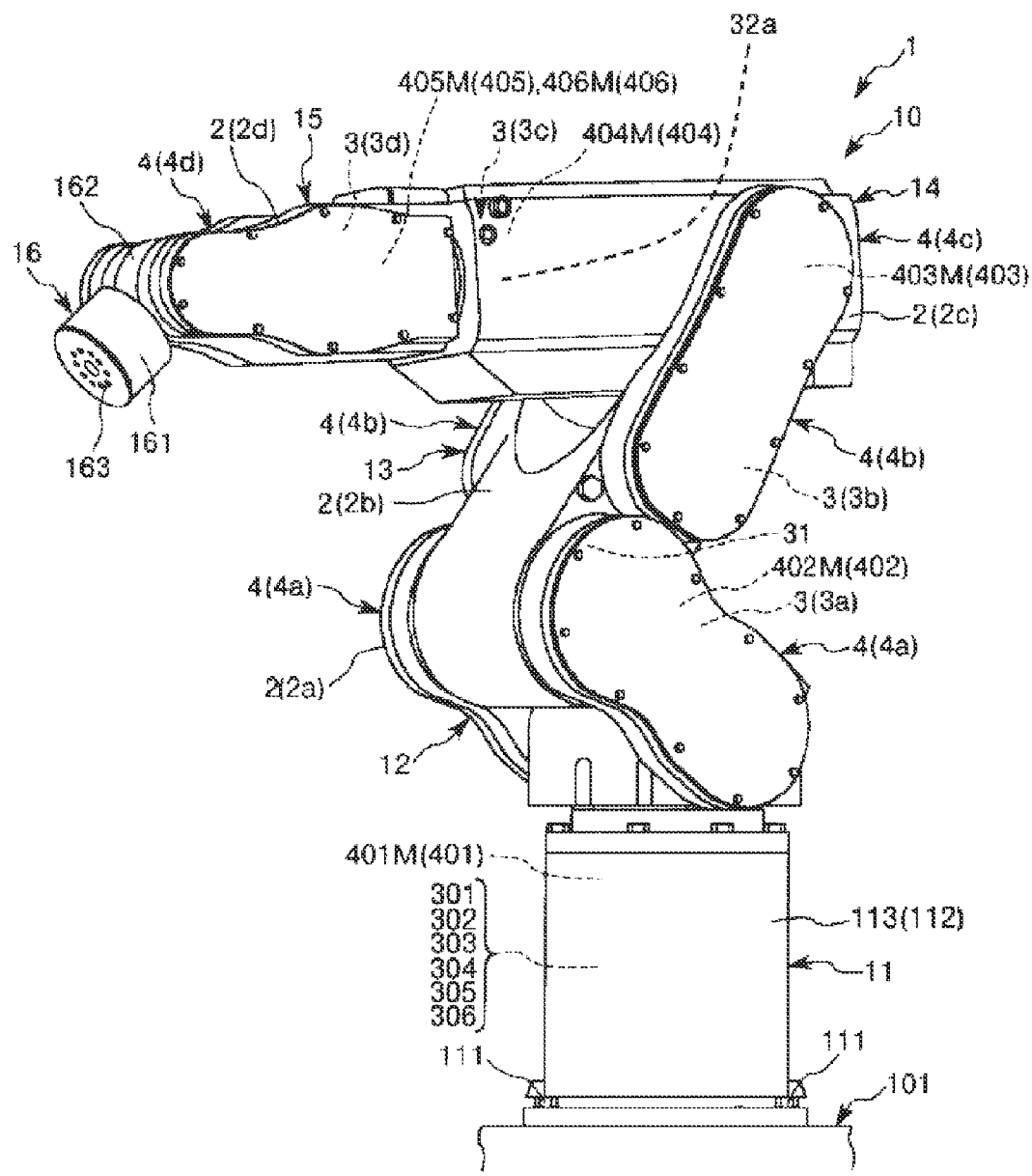
FIG. 1 is a perspective view when a first embodiment of a robot of the invention is viewed from the front side.
Figure 2:
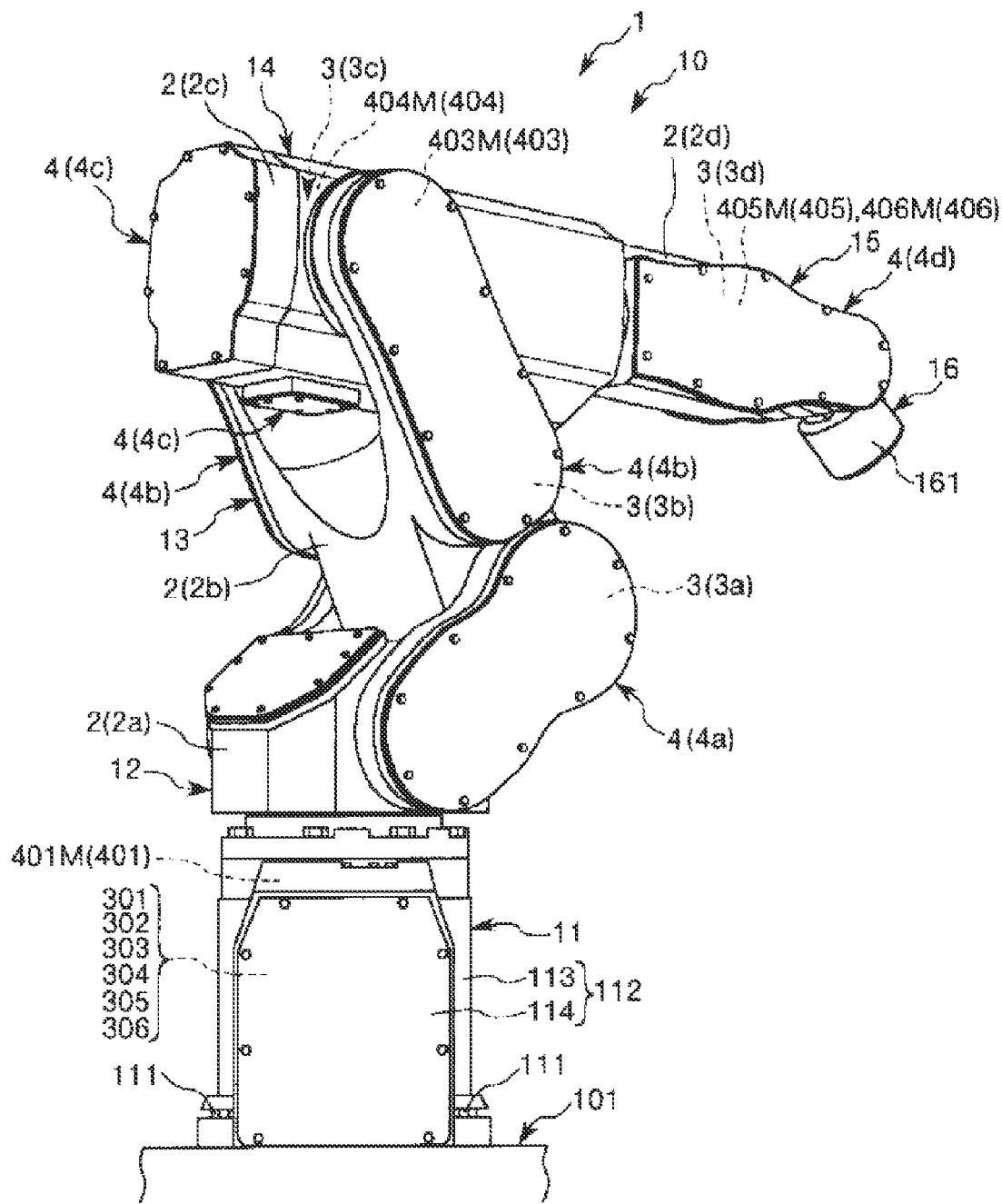
FIG. 2 is a perspective view when the robot shown in FIG. 1 is viewed from the back side.
Figure 3:
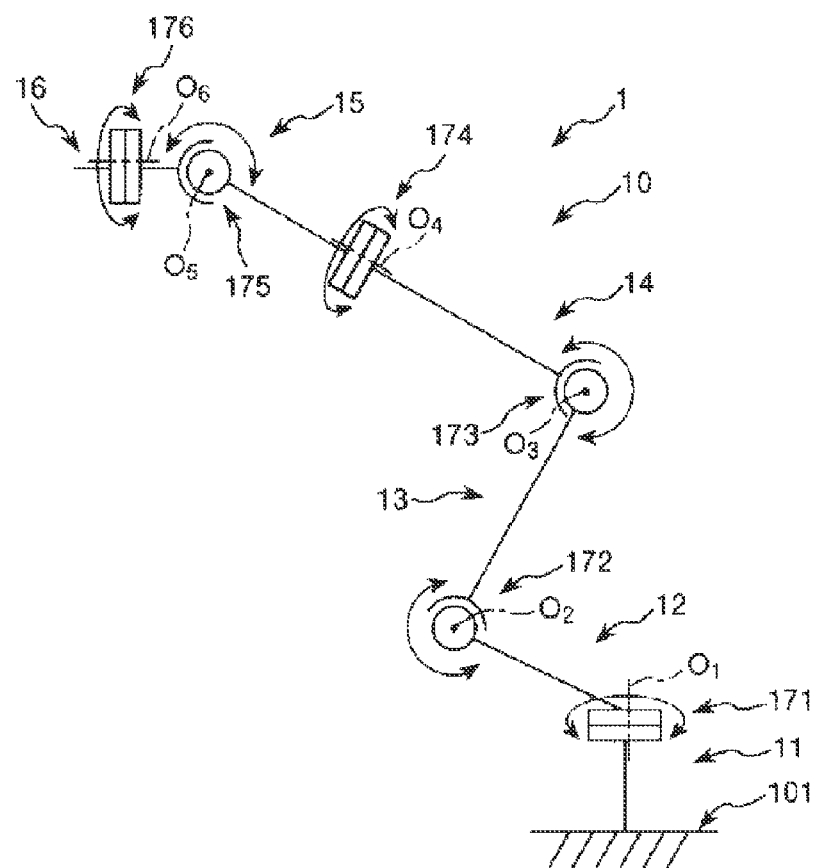
FIG. 3 is a schematic view of the robot shown in FIG. 1.
Figure 4:
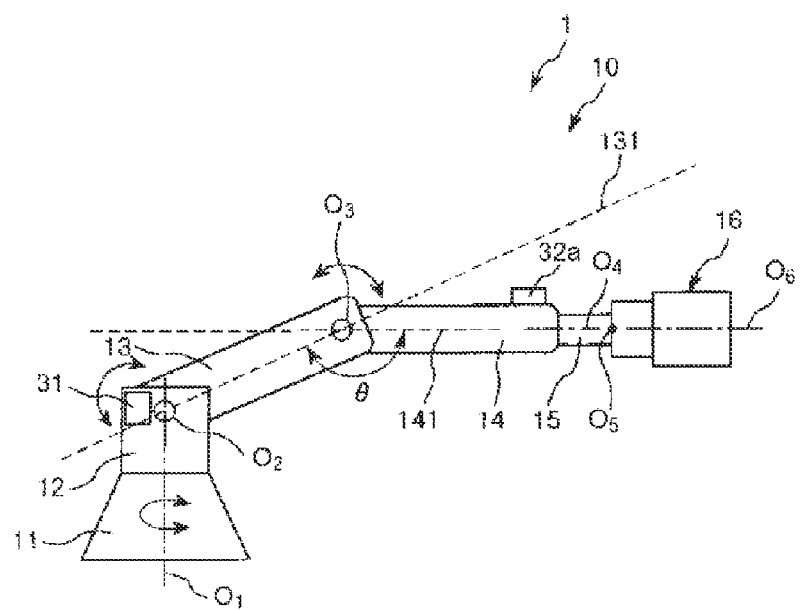
FIG. 4 is a schematic view of the robot shown in FIG. 1.
Figure 5:
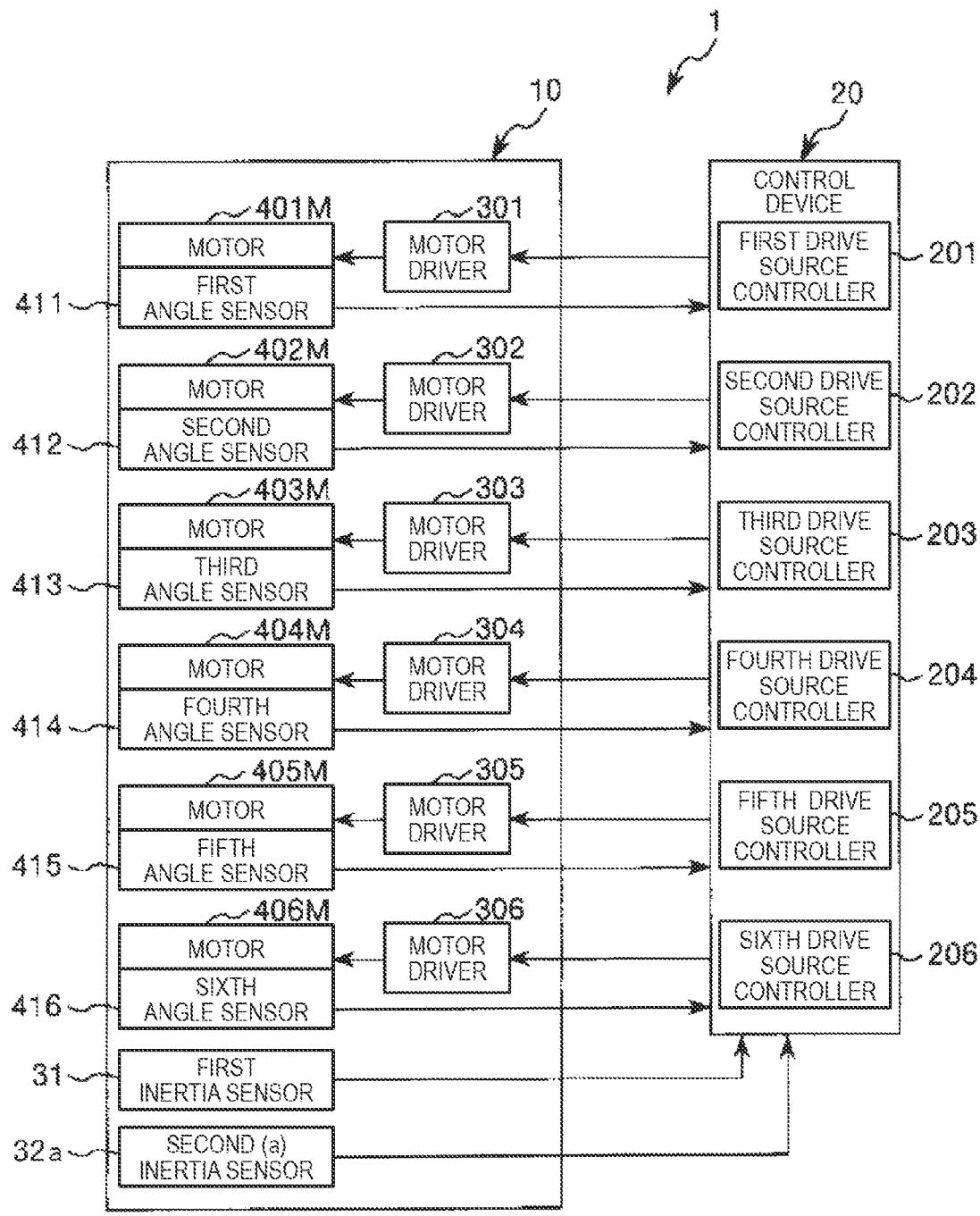
FIG. 5 is a block diagram of main portions of the robot shown in FIG. 1.

FIG. 1 is a perspective view when a first embodiment of a robot of the invention is viewed from the front side. FIG. 2 is a perspective view when the robot shown in FIG. 1 is viewed from the back side. FIGS. 3 and 4 are schematic views of the robot shown in FIG. 1, respectively. FIG. 5 is a block diagram of main portions of the robot shown in FIG. 1. FIGS. 6 to 10 are block diagrams of the main portions of the robot shown in FIG. 1, respectively. FIG. 11 is a flowchart showing the control operation of a control device of the robot shown in FIG. 1.

In addition, in the following, for the convenience of description, the upper side in FIGS. 1 to 4 and FIG. 6 is referred to as "upper" or "upside" and the lower side is referred to as "lower" or "downside". Additionally, the base side in FIGS. 1 to 4 and FIG. 6 is referred to as a "base end", and the opposite side is referred to as a "tip". Additionally, the rotation axes O2 and O3 are shown in an exaggerated manner in FIG. 4, respectively. Additionally, inertia sensors 31 and 32a are shown outside arms 12 and 14 in FIG. 4, respectively, in order to clarify the presence of the sensors.

A robot (industrial robot) 1 shown in FIGS. 1 to 4 can be used for, for example, a manufacturing process that manufactures precision mechanical equipment, such as a wrist watch, and has a robot body 10 and a control device (control unit) 20 (refer to FIG. 5) that controls the operation of the robot body 10. The robot body 10 and the control device 20 are electrically connected. Additionally, the control device 20 can be constituted by, for example, personal computers (PC) in which a central processing unit (CPU) is built. In addition, the control device 20 will be described below in more detail.

The robot body 10 includes a base 11, four arms (links) 12, 13, 14, and 15, a wrist (link) 16, and six drive sources 401, 402, 403, 404, 405, and 406. The robot body 10 is a vertical multi-joint (six-axis) robot (robot body) in which the base 11, the arms 12, 13, 14, and 15, and the wrist 16 are coupled together in the order from a base end side toward a tip side. In the vertical multi-joint robot, the base 11, the arms 12 to 15, and the wrist 16 can also be collectively referred to as "arms", and the arm 12, the arm 13, the arm 14, the arm 15, and the wrist 16 can be referred to as a "first arm", a "second arm", a "third arm", a "fourth arm", and a "fifth or sixth arm", respectively. In addition, the wrist 16 may have the fifth arm and the sixth arm. An end effector or the like can be attached to the wrist 16.

As shown in FIGS. 3 and 4, the arms 12 to 15 and the wrist 16 are supported so as to be independently displaceable with respect to the base 11. The lengths of the arms 12 to 15 and the wrist 16 are not particularly limited, respectively. However, in the illustrated configuration, the lengths of the arms 12 to 14 are set to be larger than those of the other arm 15 and the wrist 16. In addition, for example, the length of the third arm 14 may be made smaller than the lengths of the first arm 12 and the second arm 13.

The base 11 and the first arm 12 are coupled together via a joint 171. The first arm 12 has a first rotation axis O1 parallel to the vertical direction as a rotation center, and is rotatable with respect to the base 11 around the first rotation axis O1. The first rotation axis O1 coincides with the normal line of an upper surface of a floor 101 that is an installation surface of the base 11. The rotation around the first rotation axis O1 is performed by the driving of the first drive source 401. Additionally, the first drive source 401 is driven by a motor 401M and a cable (not shown), and the motor 401M is controlled by the control device 20 via a motor driver 301 that is electrically connected thereto (refer to FIG. 5). The driving from the motor 401M may be transmitted to the first drive source 401 by a speed reducer (not shown) provided together with the motor 401M, and the speed reducer may be omitted.

The first arm 12 and the second arm 13 are coupled together via a joint 172. The second arm 13 is rotatable with respect to the first arm 12 with the second rotation axis O2 parallel to the horizontal direction as an axial center. The second rotation axis O2 is orthogonal to the first rotation axis O1. The rotation around the second rotation axis O2 is performed by the driving of the second drive source 402. Additionally, the second drive source 402 is driven by a motor 402M and a cable (not shown), and the motor 402M is controlled by the control device 20 via a motor driver 302 that is electrically connected thereto (refer to FIG. 5). The driving from the motor 402M may be transmitted to the second drive source 402 by a speed reducer (not shown) provided in addition to the motor 402M, and the speed reducer may be omitted. In addition, the rotation axis O2 may be parallel to an axis orthogonal to the rotation axis O1.

The second arm 13 and the third arm 14 are coupled together via a joint 173. The third arm 14 has a rotation axis O3 parallel to the horizontal direction as a rotation center, and is rotatable with respect to the second arm 13 around the third rotation axis O3. The third rotation axis O3 is parallel to the second rotation axis O2. The rotation around the third rotation axis O3 is performed by the driving of the third drive source 403. Additionally, the third drive source 403 is driven by a motor 403M and a cable (not shown), and the motor 403M is controlled by the control device 20 via a motor driver 303 that is electrically connected thereto (refer to FIG. 5). The driving from the motor 403M may be transmitted to the third drive source 403 by a speed reducer (not shown) provided in addition to the motor 403M, and the speed reducer may be omitted.

The third arm 14 and the fourth arm 15 are coupled together via a joint 174. The fourth arm 15 has a fourth rotation axis O4 parallel to the direction of a central axis of the third arm 14 as a rotation center, and is rotatable with respect to the third arm 14 (base 11) around the fourth rotation axis O4. The fourth rotation axis O4 is orthogonal to the third rotation axis O3. The rotation around the fourth rotation axis O4 is performed by the driving of the fourth drive source 404. Additionally, the fourth drive source 404 is driven by a motor 404M and a cable (not shown), and the motor 404M is controlled by the control device 20 via a motor driver 304 that is electrically connected thereto (refer to FIG. 5). The driving from the motor 404M may be transmitted to the fourth drive source 404 by a speed reducer (not shown) provided together with the motor 404M, and the speed reducer may be omitted. In addition, the fourth rotation axis O4 may be parallel to an axis orthogonal to the third rotation axis O3.

The fourth arm 15 and the wrist 16 are coupled together via a joint 175. The wrist 16 has a fifth rotation axis O5 parallel to the horizontal direction (y-axis direction) as a rotation center, and is rotatable with respect to the fourth arm 15 around the fifth rotation axis O5. The fifth rotation axis O5 is orthogonal to the fourth rotation axis O4. The rotation around the fifth rotation axis O5 is performed by the driving of the fifth drive source 405. Additionally, the fifth drive source 405 is driven by a motor 405M and a cable (not shown), and the motor 405M is controlled by the control device 20 via a motor driver 305 that is electrically connected thereto (refer to FIG. 5). The driving from the motor 405M may be transmitted to the fifth drive source 405 by a speed reducer (not shown) provided together with the motor 405M, and the speed reducer may be omitted. Additionally, the wrist 16 has a sixth rotation axis O6 vertical to the fifth rotation axis O5 as a rotation center, and is also rotatable via a joint 176 around the sixth rotation axis O6. The rotation axis O6 is orthogonal to the rotation axis O5. The rotation around the sixth rotation axis O6 is performed by the driving of the sixth drive source 406. Additionally, the sixth drive source 406 is driven by a motor 406M and a cable (not shown), and the motor 406M is controlled by the control device 20 via a motor driver 306 that is electrically connected thereto (refer to FIG. 5). The driving from the motor 406M may be transmitted to the sixth drive source 406 by a speed reducer (not shown) provided in addition to the motor 406M, and the speed reducer may be omitted. In addition, the fifth rotation axis O5 may be parallel to an axis orthogonal to the fourth rotation axis O4, and the sixth rotation axis O6 may be parallel to an axis orthogonal to the fifth rotation axis O5.

Additionally, the first inertia sensor 31 is installed at the first arm 12. The first inertia sensor 31 detects the angular velocity of the first arm 12 around the first rotation axis O1. Although the installation position of the first inertia sensor 31 at the first arm 12 is not particularly limited, a tip portion of the first arm 12 is preferable. In the present embodiment, the first inertia sensor 31 is installed at the tip portion inside the first arm 12. Since the vibration in the third arm 12 becomes the maximum at the tip portion of the third arm, this can more reliably suppress the vibration in the robot 1. In addition, it is obvious that the first inertia sensor 31 may be installed at a base end portion of the first arm 12.

Additionally, the second (a) inertia sensor 32a is installed at the third arm 14. The second (a) inertia sensor 32a detects the angular velocity of the third arm 14 around the second rotation axis O2. Although the installation position of the second (a) inertia sensor 32a at the third arm 14 is not particularly limited, a tip portion of the third arm 14 is preferable. In the present embodiment, the second (a) inertia sensor 32a is installed at the tip portion inside the third arm 14. Since the vibration in the third arm 14 becomes the maximum at the tip portion of the third arm, this can more reliably suppress the vibration in the robot 1. In addition, it is obvious that the second (a) inertia sensor 32a may be installed at a base end portion of the third arm 14.

Additionally, the first inertia sensor 31 and the second (a) inertia sensor 32a are not particularly limited, respectively, and in the present embodiment, for example, a gyroscope sensor, an acceleration sensor, or the like can be used.

Here, in the robot 1, the vibration in the whole robot 1 is suppressed by suppressing the vibration in the arms 12, 13, and 14. However, in order to suppress the vibration in the arms 12, 13, and 14, inertia sensors are not installed at all the arms 12, 13, and 14. As mentioned above, the first inertia sensor 31 and the second (a) inertia sensor 32a are installed only at the arms 12 and 14, and the operation of the drive sources 401 and 402 is controlled on the basis of detection results of the first inertia sensor 31 and the second (a) inertia sensor 32a. Accordingly, compared to a case where inertia sensors are installed at all the arms 12, 13, and 14, the number of the inertia sensors can be reduced, costs can be reduced, and circuit configuration can be simplified.

A first angle sensor 411, a second angle sensor 412, a third angle sensor 413, a fourth angle sensor 414, a fifth angle sensor 415, and a sixth angle sensor 416 are provided at respective motors or speed reducers in the drive sources 401 to 406. Encoders, rotary encoders, or the like can be used as the angle sensors. The angle sensors 411 to 416 detect the rotation angles of rotating shafts of the motors or speed reducers of the drive sources 401 to 406, respectively. The motors of the drive sources 401 to 406 are not particularly limited, respectively. For example, it is preferable to use servo motors, such as AC servo motors or DC servo motors. Additionally, the respective cables may be inserted through the robot body 10, respectively.

As shown in FIG. 5, the robot body 10 is electrically connected to the control device 20. That is, the drive sources 401 to 406, the angle sensors 411 to 416, and the inertia sensors 31 and 32a are electrically connected to the control device 20, respectively.

The control device 20 can independently operate the arms 12 to 15 and the wrist 16, respectively, that is, can independently control the drive sources 401 to 406 via the motor drivers 301 to 306, respectively. In the case, the control device 20 performs detection by the angle sensors 411 to 416, the first inertia sensor 31, and the second (a) inertia sensor 32a, and controls the driving, for example, angular velocity, rotation angle, or the like of the drive sources 401 to 406 on the basis of the detection results, respectively. A control program is stored in advance in a recording medium built in the control device 20.

As shown in FIG. 1 and FIG. 2, when the robot 1 is a vertical multi-joint robot, the base 11 is a portion that is located on the lowermost side of the vertical multi-joint robot and is fixed to the floor 101 of an installation space. The fixing method is not particularly limited, and for example, in the present embodiment shown in FIGS. 1 and 2, a fixing method using a plurality of bolts 111 is used. In addition, a fixing place in the installation space of the base 11 can also be the wall or ceiling of the installation space other than the floor.

The base 11 has a hollow base body (housing) 112. The base body 112 can be separated into a cylindrical portion 113 that forms a cylindrical shape, and a box-shaped portion 114 that is integrally formed at an outer peripheral portion of the cylindrical portion 113 and forms a box shape. For example, the motor 401M and the motor drivers 301 to 306 are stored in such a base body 112.

The arms 12 to 15 have a hollow arm body 2, a drive mechanism 3, and a sealing unit 4, respectively. In addition, in the following, for the convenience of description, the arm body 2, the drive mechanism 3, and the sealing unit 4 of the first arm 12 may be referred to as an "arm body $2a$", a "drive mechanism $3a$", and a "sealing unit $4a$", respectively, the arm body 2, the drive mechanism 3, and the sealing unit 4 of the second arm 13 may be referred to as an "arm body $2b$", a "drive mechanism $3b$", and a "sealing unit $4b$", respectively, the arm body 2, the drive mechanism 3, and the sealing unit 4 of the third arm 14 may be referred to as an "arm body $2c$", a "drive mechanism $3c$", and a "sealing unit $4c$", respectively, and the arm body 2, the drive mechanism 3, and the sealing unit 4 of the fourth arm 15 may be referred to as an "arm body $2d$", a "drive mechanism $3d$", and a "sealing unit $4d$", respectively.

Additionally, the joints 171 to 176 have rotation support mechanisms (not shown), respectively. The rotation support mechanisms are a mechanism that supports one of two arms coupled to each other so as to be rotatable to the other, a mechanism that supports one of the base 11 and the first arm 12 coupled to each other so as to be rotatable to the other, and a mechanism that supports one of the fourth arm 15 and the wrist 16 coupled to each other so as to be rotatable to the other. When the fourth arm 15 and the wrist 16 coupled to each other are taken as an example, the rotation support mechanism can rotate the wrist 16 with respect to the fourth arm 15. Additionally, each rotation support mechanism has a speed reducer (not shown) that reduces the rotating speed of a corresponding motor in a predetermined reduction ratio, and transmits the driving force thereof to a corresponding arm, the wrist body 161 of the wrist 16, and a support ring 162.

The first arm 12 is coupled to an upper end portion (tip portion) of the base 11 in a posture in which the first arm inclines with respect to the horizontal direction. In the first arm 12, the drive mechanism $3a$ has the motor 402M, and is stored within the arm body $2a$. Additionally, the inside of the arm body $2a$ is hermetically sealed by the sealing unit $4a$.

The second arm 13 is coupled to a tip portion of the first arm 12. In the second arm 13, the drive mechanism $3b$ has the motor 403M, and is stored within the arm body $2b$. Additionally, the inside of the arm body $2b$ is hermetically sealed by the sealing unit $4b$.

The third arm 14 is coupled to a tip portion of the second arm 13. In the third arm 14, the drive mechanism $3c$ has the motor 404M, and is stored within the arm body $2c$. Additionally, the inside of the arm body $2c$ is hermetically sealed by the sealing unit $4c$.

The fourth arm 15 is coupled to a tip portion of the third arm 14 in parallel with the direction of a central axis thereof. In the arm 15, the drive mechanism $3d$ has the motors 405M and 406M, and is stored within the arm body $2d$. Additionally, the inside of the arm body $2d$ is hermetically sealed by the sealing unit $4d$.

The wrist 16 is coupled to a tip portion (end portion opposite the base 11) of the fourth arm 15. For example, a manipulator (not shown) that grips precision mechanical equipment, such as a wrist watch, is detachably mounted on a tip portion (an end portion opposite the fourth arm 15) of the wrist 16. In addition, the manipulator is not particularly limited, and includes, for example, a manipulator of a configuration having a plurality of fingers. The robot 1 can convey the precision mechanical equipment by controlling the operation of the arms 12 to 15, the wrist 16, or the like with the precision mechanical equipment gripped by the manipulator.

The wrist 16 has the wrist body (sixth arm) 161 that forms a cylindrical shape, and the support ring (fifth arm) 162 that is configured separately from the wrist body 161, is provided at a base end portion of the wrist body 161, and forms a ring shape.

A tip face 163 of the wrist body 161 is a flat surface, and serves as a mounting surface on which the manipulator is mounted. Additionally, the wrist body 161 is coupled to the drive mechanism $3d$ of the fourth arm 15 via the joint 176, and is rotated around the rotation axis O6 by the driving of the motor 406M of the drive mechanism $3d$.

The support ring 162 is coupled to the drive mechanism $3d$ of the fourth arm 15 via the joint 175, and is rotated around the rotation axis O5 of the whole wrist body 161 by the driving of the motor 405M of the drive mechanism $3d$.

Next, the configuration of the control device 20 will be described with reference to FIGS. 5 and 6 to 10.

As shown in FIGS. 5 and 6 to 10, the control device 20 has a first drive source controller (first drive source control unit) (first angular velocity command) 201 that controls the operation of the first drive source 401, a second drive source controller (second drive source control unit) (second angular velocity command) 202 that controls the operation of the second drive source 402, a third drive source controller (third drive source control unit) (third angular velocity command) 203 that controls the operation of the third drive source 403, a fourth drive source controller (fourth drive source control unit) (fourth angular velocity command) 204 that controls the operation of the fourth drive source 404, a fifth drive source controller (fifth drive source control unit) (fifth angular velocity command) 205 that controls the operation of the fifth drive source 405, and a sixth drive source controller (sixth drive source control unit) (sixth angular velocity command) 206 that controls the operation of the sixth drive source 406.

Figure 6:
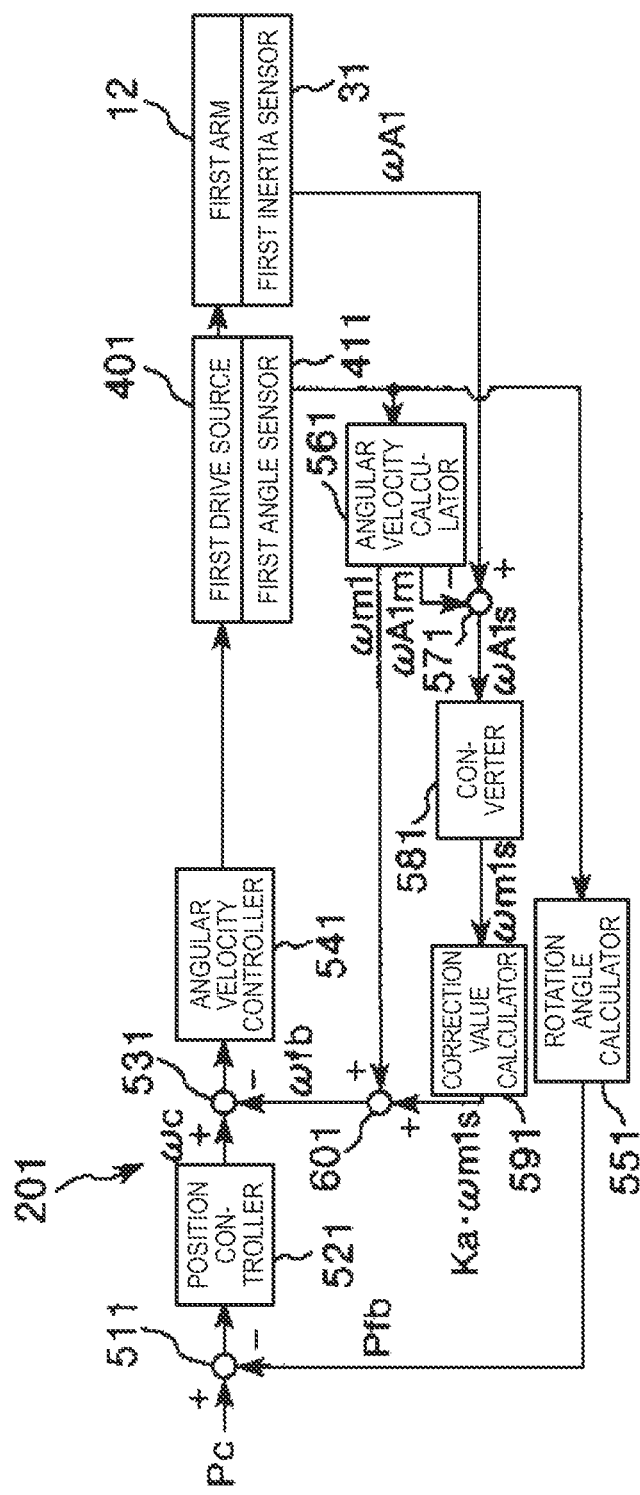
FIG. 6 is a block diagram of main portions of the robot shown in FIG. 1.

As shown in FIG. 6, the first drive source controller 201 has a subtractor 511, a position controller 521, a subtractor 531, an angular velocity controller 541, a rotation angle calculator 551, an angular velocity calculator 561, a subtractor 571, a converter 581, a correction value calculator 591, and an adder 601.

Figure 7:
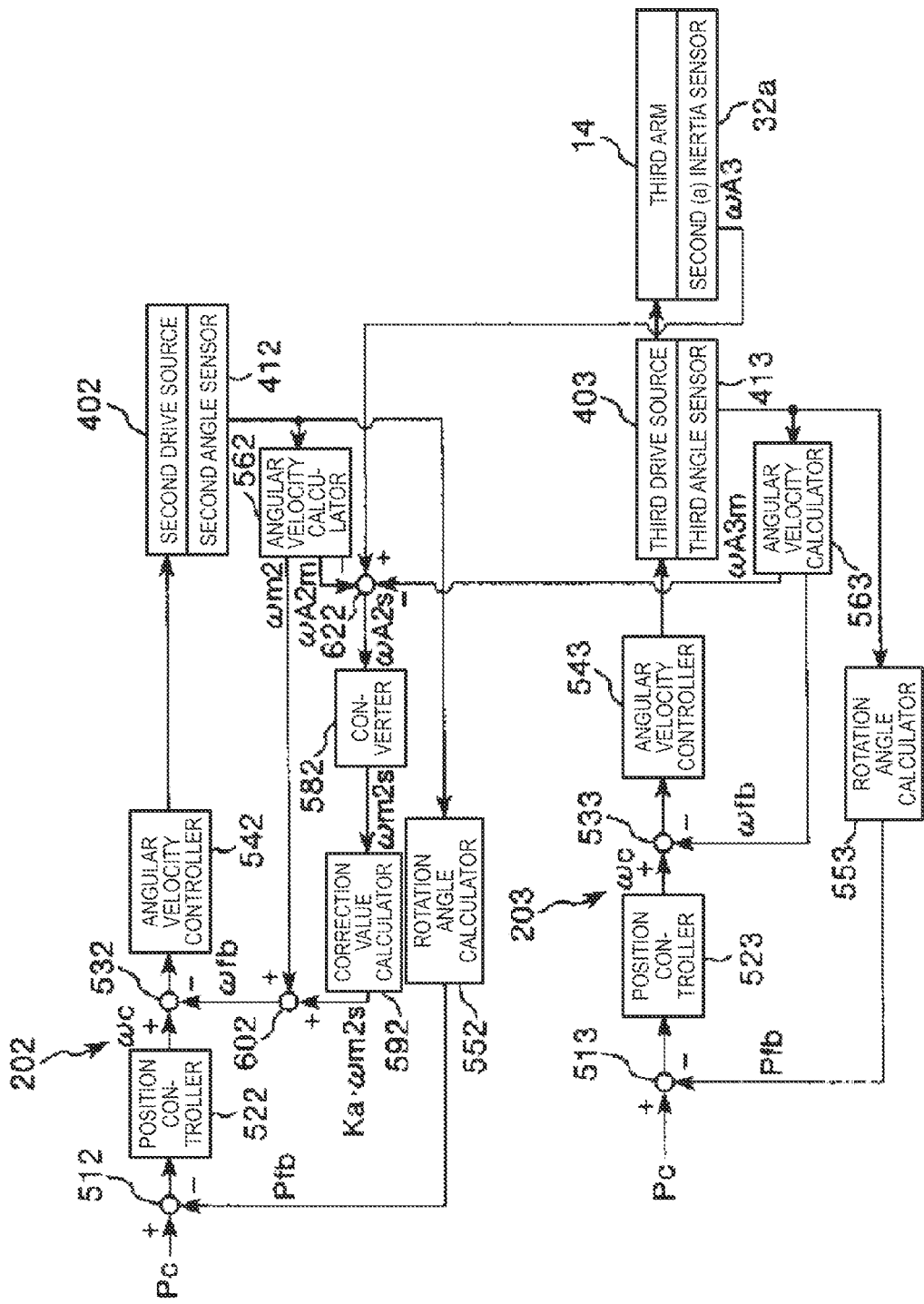
FIG. 7 is a block diagram of main portions of the robot shown in FIG. 1.

As shown in FIG. 7, the second drive source controller 202 has a subtractor 512, a position controller 522, a subtractor 532, an angular velocity controller 542, a rotation angle calculator 552, an angular velocity calculator 562, an adder-subtractor 622, a converter 582, a correction value calculator 592, and an adder 602.

As shown in FIG. 7, the third drive source controller 203 has a subtractor 513, a position controller 523, a subtractor 533, an angular velocity controller 543, a rotation angle calculator 553, and an angular velocity calculator 563.

Figure 8:
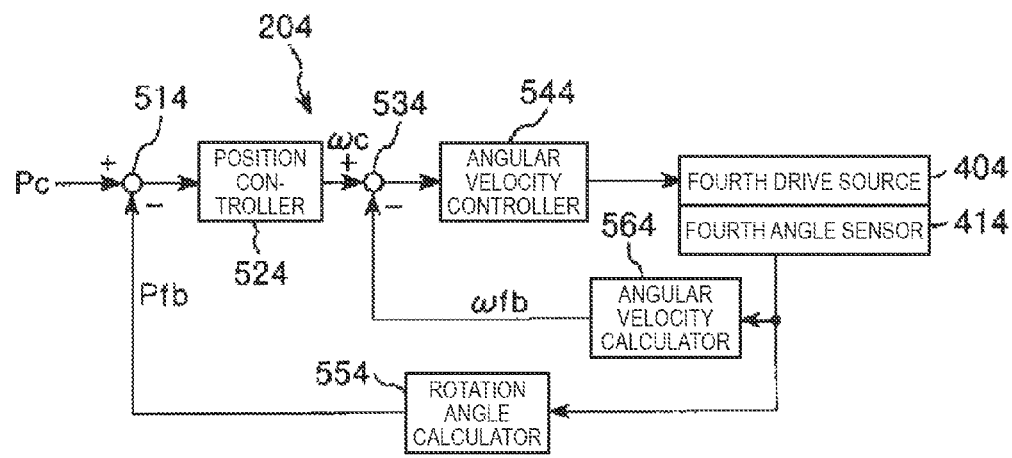
FIG. 8 is a block diagram of main portions of the robot shown in FIG. 1.

As shown in FIG. 8, the fourth drive source controller 204 has a subtractor 514, a position controller 524, a subtractor 534, an angular velocity controller 544, a rotation angle calculator 554, and an angular velocity calculator 564.

Figure 9:
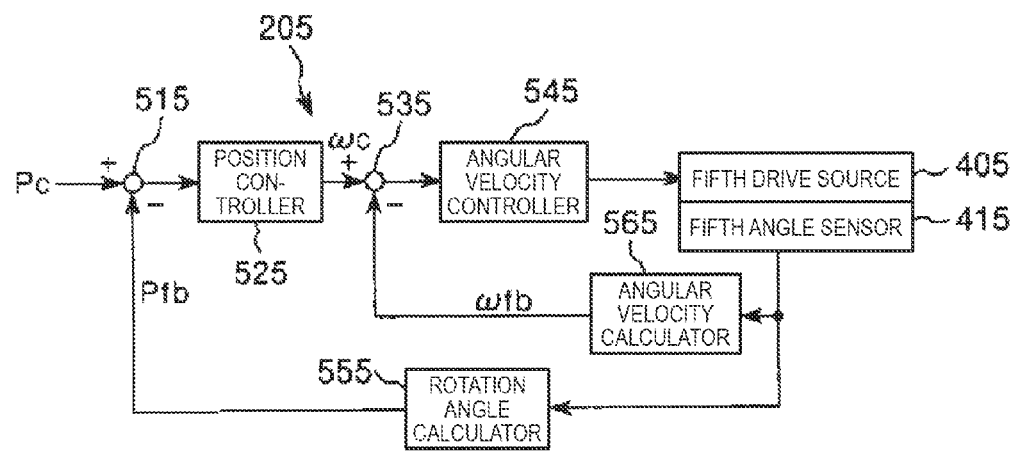
FIG. 9 is a block diagram of main portions of the robot shown in FIG. 1.

As shown in FIG. 9, the fifth drive source controller 205 has a subtractor 515, a position controller 525, a subtractor 535, an angular velocity controller 545, a rotation angle calculator 555, and an angular velocity calculator 565.

Figure 10:
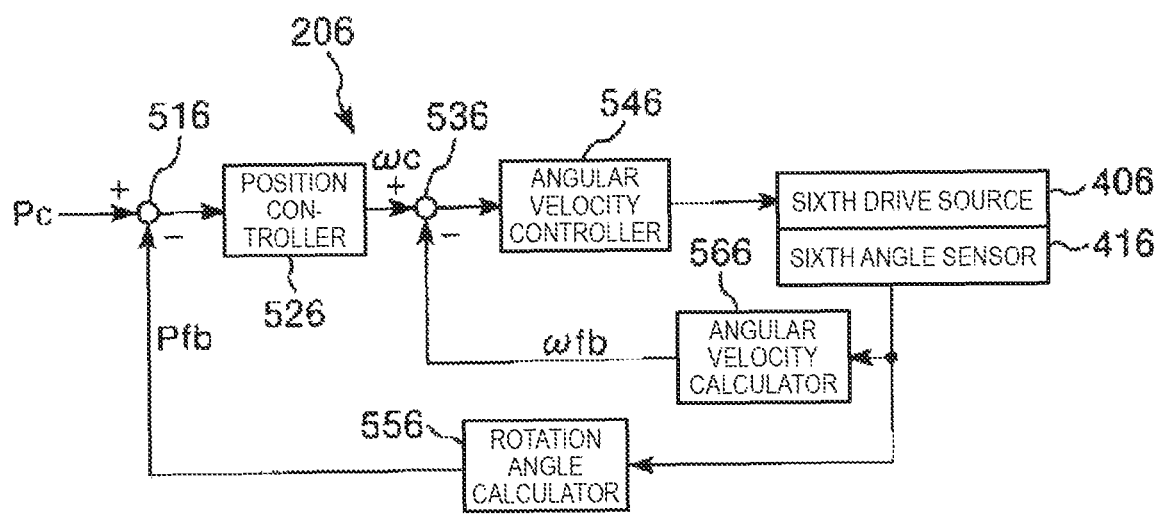
FIG. 10 is a block diagram of main portions of the robot shown in FIG. 1.
Figure 11:
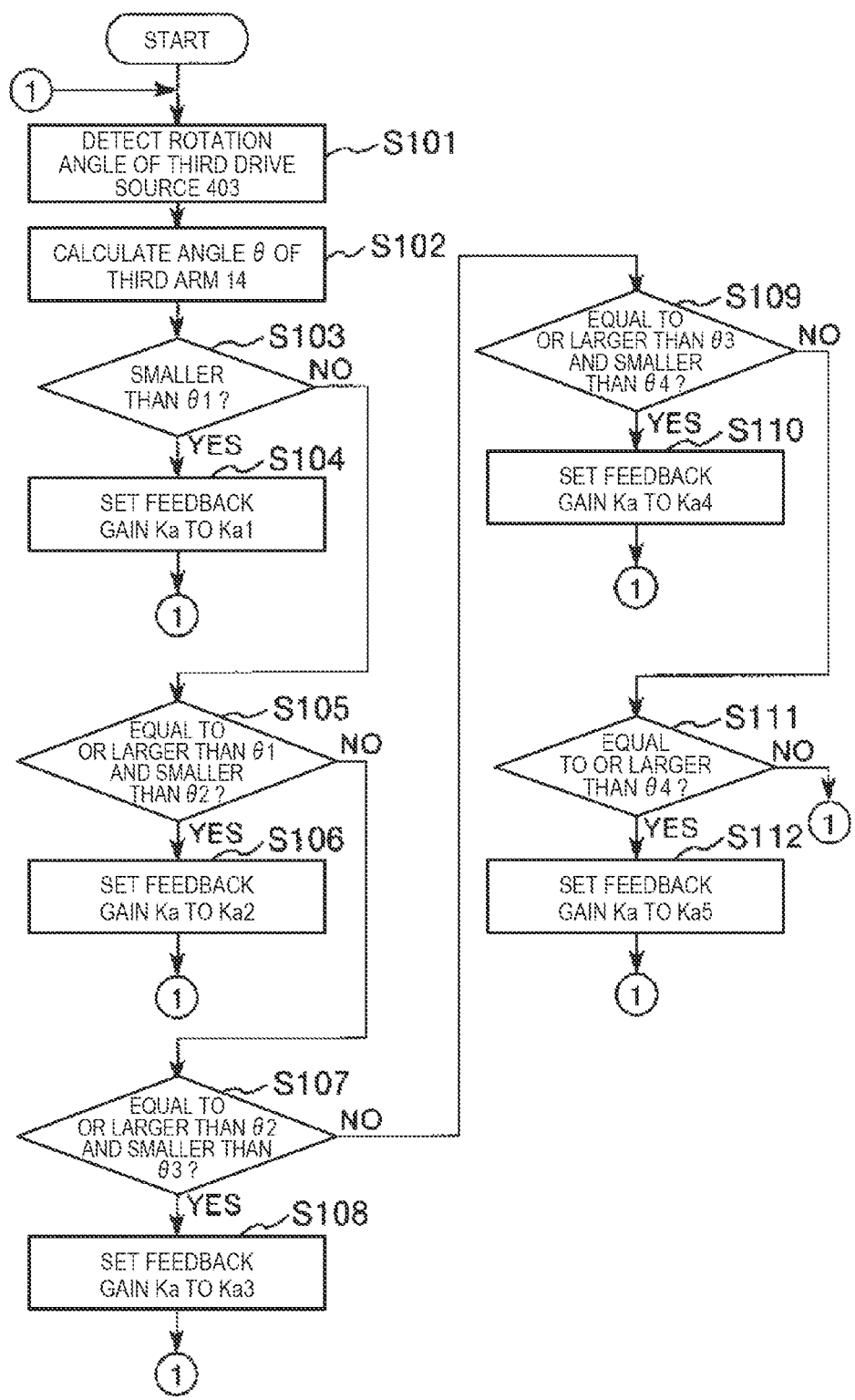
FIG. 11 is a flowchart showing the control operation of a control device of the robot shown in FIG. 1.

As shown in FIG. 10, the sixth drive source controller 206 has a subtractor 516, a position controller 526, a subtractor 536, an angular velocity controller 546, a rotation angle calculator 556, and an angular velocity calculator 566.

Here, the control device 20 calculates a target position of the wrist 16 on the basis of the contents of processing to be performed by the robot 1, and generates a track for moving the wrist 16 to the target position. The control device 20 measures the rotation angles of the respective drive sources 401 to 406 for every predetermined control cycle so that the wrist 16 moves along the generated track, and outputs values calculated on the basis of the measurement results to the drive source controllers 201 to 206 as position commands Pc of the respective drive sources 401 to 406, respectively (refer to FIGS. 6 to 10). In addition, although "values are input, output" or the like are written in the above and the following, this means "signals corresponding to the values are input, output".

As shown in FIG. 6, in addition to a position command Pc of the first drive source 401, detection signals are input from the first angle sensor 411 and the first inertia sensor 31, respectively, to the first drive source controller 201. The first drive source controller 201 drives the first drive source 401 by a feedback control using the respective detection signals so that a rotation angle (position feedback value Pfb) of the first drive source calculated from the detection signal of the first angle sensor 411 becomes the position command Pc and an angular velocity feedback value ωfb to be described below becomes an angular velocity command ωc to be described below.

That is, the position command Pc is input to the subtractor 511 of the first drive source controller 201, and the position feedback value Pfb to be described below is input from the rotation angle calculator 551. In the rotation angle calculator 551, the number of pulses input from the first angle sensor 411 is counted, and the rotation angle of the first drive source 401 according to the counted value is output to the subtractor 511 as the position feedback value Pfb. The subtractor 511 outputs a deviation (value obtained by subtracting the position feedback value Pfb from a targeted value of the rotation angle of the first drive source 401) between the position command Pc and the position feedback value Pfb to the position controller 521.

The position controller 521 performs predetermined calculation processing using the deviation input from the subtractor 511 and a proportional gain that is a predetermined factor, and calculates the targeted value of the angular velocity of the first drive source 401 according to the deviation. The position controller 521 outputs a signal showing the targeted value (command value) of the angular velocity of the first drive source 401 to the subtractor 531 as the angular velocity command (first angular velocity command) ωc. In addition, in the present embodiment, a proportional control (P control) is performed as the feedback control. However, the feedback control is not limited to this.

The angular velocity command ωc and the angular velocity feedback value ωfb to be described below are input to the subtractor 531. The subtractor 531 outputs a deviation (value obtained by subtracting the angular velocity feedback value ωfb from the targeted value of the angular velocity of the first drive source 401) between the angular velocity command ωc and the angular velocity feedback value ωfb to the angular velocity controller 541.

The angular velocity controller 541 performs predetermined calculation processing including integration, using the deviation input from the subtractor 531, a proportional gain that is a predetermined factor, an integration gain, or the like, thereby generating a driving signal (driving current) of the first drive source 401 according to the deviation and supplying the driving signal to the motor 401M via the motor driver 301. In addition, in the present embodiment, the PI control is performed as the feedback control. However, the feedback control is not limited to this.

In this way, the feedback control is performed and the driving current of the first drive source 401 is controlled so that the position feedback value Pfb is as equal to the position command Pc as possible and the angular velocity feedback value ωfb is as equal to the angular velocity command ωc as possible.

Next, the angular velocity feedback value ωfb in the first drive source controller 201 will be described.

In the angular velocity calculator 561, an angular velocity ωm1 of the first drive source 401 is calculated on the basis of the frequency of a pulse signal input from the first angle sensor 411, and the angular velocity ωm1 is output to the adder 601.

Additionally, in the angular velocity calculator 561, an angular velocity ωA1m of the first arm 12 around the rotation axis O1 is calculated on the basis of the frequency of the pulse signal input from the first angle sensor 411, and the angular velocity ωA1m is output to the subtractor 571. In addition, the angular velocity ωA1m is a value obtained by dividing the angular velocity ωm1 by a reduction ratio between the motor 401M of the first drive source 401 and the first arm 12, that is, in the joint 171.

Additionally, the angular velocity of the first arm 12 around the rotation axis O1 is detected by the first inertia sensor 31. A detection signal of the first inertia sensor 31, that is, an angular velocity ωA1 of the first arm 12 around the rotation axis O1 detected by the first inertia sensor 31 is output to the subtractor 571.

The angular velocity ωA1 and the angular velocity ωA1m are input to the subtractor 571, and the subtractor 571 outputs a value ωA1s (=ωA1−ωA1m) obtained by subtracting the angular velocity ωA1m from the angular velocity ωA1 to the converter 581. The value ωA1s is equivalent to a vibration component (vibration angular velocity) of the angular velocity of the first arm 12 around the rotation axis O1. Hereinafter, ωA1s is referred to as a vibration angular velocity. In the present embodiment, a feedback control is performed in which the vibration angular velocity ωA1s (in detail, an angular velocity ωm1s in the motor 401M that is a value generated on the basis of the vibration angular velocity ωA1s) is multiplied by a gain Ka to be described below and is returned to the input side of the drive source 401. Specifically, a feedback control is performed on the drive source 401 so that the vibration angular velocity ωA1s becomes as close to 0 as possible. Accordingly, the vibration in the robot 1 can be suppressed. In addition, the angular velocity of the drive source 401 is controlled in the feedback control.

The converter 581 converts the vibration angular velocity ωA1s into the angular velocity ωm1s in the first drive source 401, and outputs the angular velocity ωm1s to the correction value calculator 591. This conversion can be obtained by multiplying the vibration angular velocity ωA1s by the reduction ratio between the motor 401M of the first drive source 401 and the first arm 12, that is, in the joint 171.

The correction value calculator 591 multiplies the angular velocity ωm1s by a gain (feedback gain) Ka that is a predetermined factor, obtains a correction value (first correction component) Ka·ωm1s, and outputs the correction value Ka·ωm1s to the adder 601.

The angular velocity ωm1 and the correction value Ka·ωm1s are input to the adder 601. The adder 601 outputs an additional value of the angular velocity ωm1 and the correction value Ka·ωm1s to the subtractor 531 as the angular velocity feedback value ωfb. In addition, the subsequent operation is as mentioned above.

As shown in FIG. 7, in addition to a position command Pc of the second drive source 402, detection signals are input from the second angle sensor 412 and the second (a) inertia sensor 32a, respectively, to the second drive source controller 202. Additionally, an angular velocity ωA3m of the third arm 14 around the rotation axis O3 is input from the third drive source controller 203 to the second drive source controller 202. The second drive source controller 202 drives the second drive source 402 by a feedback control using the respective detection signals so that a rotation angle (position feedback value Pfb) of the second drive source 402 calculated from the detection signal of the second angle sensor 412 becomes the position command Pc and an angular velocity feedback value ωfb to be described below becomes an angular velocity command ωc to be described below.

That is, the position command Pc is input to the subtractor 512 of the second drive source controller 202, and the position feedback value Pfb to be described below is input from the rotation angle calculator 552. In the rotation angle calculator 552, the number of pulses input from the second angle sensor 412 is counted, and the rotation angle of the second drive source 402 according to the counted value is output to the subtractor 512 as the position feedback value Pfb. The subtractor 512 outputs a deviation (value obtained by subtracting the position feedback value Pfb from a targeted value of the rotation angle of the second drive source 402) between the position command Pc and the position feedback value Pfb to the position controller 522.

The position controller 522 performs predetermined calculation processing using the deviation input from the subtractor 512 and a proportional gain that is a predetermined factor, and calculates the targeted value of the angular velocity of the second drive source 402 according to the deviation. The position controller 522 outputs a signal showing the targeted value (command value) of the angular velocity of the second drive source 402 to the subtractor 532 as the angular velocity command (second angular velocity command) ωc. In addition, in the present embodiment, a proportional control (P control) is performed as the feedback control. However, the feedback control is not limited to this.

The angular velocity command ωc and the angular velocity feedback value ωfb to be described below are input to the subtractor 532. The subtractor 532 outputs a deviation (value obtained by subtracting the angular velocity feedback value ωfb from the targeted value of the angular velocity of the second drive source 402) between the angular velocity command ωc and the angular velocity feedback value ωfb to the angular velocity controller 542.

The angular velocity controller 542 performs predetermined calculation processing including integration, using the deviation input from the subtractor 532, a proportional gain that is a predetermined factor, an integration gain, or the like, thereby generating a driving signal (driving current) of the second drive source 402 according to the deviation and supplying the driving signal to the motor 402M via the motor driver 302. In addition, in the present embodiment, the PI control is performed as the feedback control. However, the feedback control is not limited to this.

In this way, the feedback control is performed and the driving current of the second drive source 402 is controlled so that the position feedback value Pfb is as equal to the position command Pc as possible and the angular velocity feedback value ωfb is as equal to the angular velocity command ωc as possible. In addition, since the rotation axis O2 is orthogonal to the rotation axis O1, the rotation axis is not influenced by the operation or vibration of the first arm 12, and the operation of the second drive source 402 can be controlled independently from the first drive source 401.

Next, the angular velocity feedback value ωfb in the second drive source controller 202 will be described.

In the angular velocity calculator 562, an angular velocity ωm2 of the second drive source 402 is calculated on the basis of the frequency of a pulse signal input from the second angle sensor 412, and the angular velocity ωm2 is output to the adder 602.

Additionally, in the angular velocity calculator 562, the angular velocity ωA2m of the second arm 13 around the rotation axis O2 is calculated on the basis of the frequency of the pulse signal input from the second angle sensor 412, and the angular velocity ωA2m is output to the adder-subtractor 622. In addition, the angular velocity ωA2m is a value obtained by dividing the angular velocity ωm2 by a reduction ratio between the motor 402M of the second drive source 402 and the second arm 13, that is, in the joint 172.

Additionally, the angular velocity of the third arm 14 around the rotation axis O2 is detected by the second (a) inertia sensor 32a. A detection signal of the second (a) inertia sensor 32a, that is, an angular velocity ωA3 of the third arm 14 around the rotation axis O2 detected by the second (a) inertia sensor 32a is output to the adder-subtractor 622. In addition, since the rotation axes O2 and O3 are orthogonal to the rotation axis O1, the angular velocity of the third arm 14 around the rotation axis O2 can be easily and reliably obtained without being influenced by the operation or vibration of the first arm 12.

Additionally, an angular velocity ωA3m of the third arm 14 around the rotation axis O3 is output from the angular velocity calculator 563 of the third drive source controller 203 to be described below to the adder-subtractor 622.

The angular velocity ωA3, the angular velocity ωA2m, and the angular velocity ωA3m are input to the adder-subtractor 622, and the adder-subtractor 622 outputs a value ωA2s (=ωA3−ωA2m−ωA3m) obtained by subtracting the angular velocity ωA2m and the angular velocity ωA3m from the angular velocity ωA3 to the converter 582. The value ωA2s is equivalent to a vibration component (vibration angular velocity) of the total angular velocity of the second arm 13 and the third arm 14 around the rotation axis O2. Hereinafter, ωA2s is referred to as a vibration angular velocity. In the present embodiment, a feedback control is performed in which the vibration angular velocity ωA2s (in detail, an angular velocity ωm2s in the motor 402M that is a value generated on the basis of the vibration angular velocity ωA2s) is multiplied by a gain Ka to be described below and is returned to the input side of the second drive source 402. Specifically, a feedback control is performed on the second drive source 402 so that the vibration angular velocity ωA2s becomes as close to 0 as possible. Accordingly, the vibration in the robot 1 can be suppressed. In addition, the angular velocity of the second drive source 402 is controlled in the feedback control.

The converter 582 converts the vibration angular velocity ωA2s into the angular velocity ωm2s in the second drive source 402, and outputs the angular velocity ωm2s to the correction value calculator 592. This conversion can be obtained by multiplying the vibration angular velocity ωA2s by the reduction ratio between the motor 402M of the second drive source 402 and the second arm 13, that is, in the joint 172.

The correction value calculator 592 multiplies the angular velocity ωm2s by a gain (feedback gain) Ka that is a predetermined factor, obtains a correction value (second correction component) Ka·ωm2s, and outputs the correction value Ka·ωm2s to the adder 602. In addition, the gain Ka in the second drive source controller 202 and the gain Ka in the first drive source controller 201 may be the same or may be different.

The angular velocity ωm2 and the correction value Ka·ωm2s are input to the adder 602. The adder 602 outputs an additional value of the angular velocity ωm2 and the correction value Ka·ωm2s to the subtractor 532 as the angular velocity feedback value ωfb. In addition, the subsequent operation is as mentioned above.

As shown in FIG. 7, in addition to a position command Pc of the third drive source 403, a detection signal is input from the third angle sensor 413 to the third drive source controller 203. The third drive source controller 203 drives the third drive source 403 by a feedback control using the respective detection signals so that a rotation angle (position feedback value Pfb) of the third drive source 403 calculated from the detection signal of the third angle sensor 413 becomes the position command Pc and an angular velocity feedback value ωfb to be described below becomes an angular velocity command ωc to be described below.

That is, the position command Pc is input to the subtractor 513 of the third drive source controller 203, and the position feedback value Pfb to be described below is input from the rotation angle calculator 553. In the rotation angle calculator 553, the number of pulses input from the third angle sensor 413 is counted, and the rotation angle of the third drive source 403 according to the counted value is output to the subtractor 513 as the position feedback value Pfb. The subtractor 513 outputs a deviation (value obtained by subtracting the position feedback value Pfb from a targeted value of the rotation angle of the third drive source 403) between the position command Pc and the position feedback value Pfb to the position controller 523.

The position controller 523 performs predetermined calculation processing using the deviation input from the subtractor 513, a proportional gain that is a predetermined factor, and the like and calculates the targeted value of the angular velocity of the third drive source 403 according to the deviation. The position controller 523 outputs a signal showing the targeted value (command value) of the angular velocity of the third drive source 403 to the subtractor 533 as the angular velocity command ωc. In addition, in the present embodiment, a proportional control (P control) is performed as the feedback control. However, the feedback control is not limited to this.

Additionally, in the angular velocity calculator 563, the angular velocity of the third drive source 403 is calculated on the basis of the frequency of a pulse signal input from the third angle sensor 413, and the angular velocity is output to the subtractor 533 as the angular velocity feedback value ωfb.

The angular velocity command ωc and the angular velocity feedback value ωfb are input to the subtractor 533. The subtractor 533 outputs a deviation (value obtained by subtracting the angular velocity feedback value ωfb from the targeted value of the angular velocity of the third drive source 403) between the angular velocity command ωc and the angular velocity feedback value ωfb to the angular velocity controller 543.

The angular velocity controller 543 performs predetermined calculation processing including integration, using the deviation input from the subtractor 533, a proportional gain that is a predetermined factor, an integration gain, or the like, thereby generating a driving signal (driving current) of the third drive source 403 according to the deviation and supplying the driving signal to the motor 403M via the motor driver 303. In addition, in the present embodiment, the PI control is performed as the feedback control. However, the feedback control is not limited to this.

In this way, the feedback control is performed and the driving current of the third drive source 403 is controlled so that the position feedback value Pfb is as equal to the position command Pc as possible and the angular velocity feedback value ωfb is as equal to the angular velocity command ωc as possible.

In addition, since the drive source controllers 204 to 206 are the same as of the third drive source controller 203, respectively, the description thereof will be omitted.

Here, the robot 1 has an angle detection unit that detects the angle θ (hereinafter simply referred to as "angle θ of the third arm 14", "angle θ of the arm 14", and "angle θ") formed between an axis (central axis) 131 of the second arm 13, and an axis (central axis) 141 of the third arm 14 (refer to FIG. 4), as a posture detection unit that detects the posture of the third arm 14 with the second arm 13 as a reference. In the present embodiment, the angle detection unit is constituted by the third angle sensor 413 and the control device 20. That is, the rotation angle calculator 553 of the third drive source controller 203 of the control device 20 counts the number of pulses input from the third angle sensor 413, obtains the rotation angle of the third drive source 403 according to the counted value, and accordingly, obtains the current angle θ of the third arm 14.

The second drive source controller 202 (posture detection unit) adjusts (derives) a feedback gain Ka on the basis of the detection result of the angle detection unit, that is, the detected angle θ of the third arm 14, in the aforementioned feedback control.

In this case, the second drive source controller 202 sets the feedback gain Ka to be larger as the angle θ of the third arm 14 is closer to 180°. That is, when the angle θ of the third arm 14 is within a range of being equal to or larger than 0° and smaller than 180°, the feedback gain Ka is set to be smaller as the angle θ of the third arm 14 is closer to 0°, and similarly, when the angle θ of the third arm 14 is within a range of being equal to or larger than 180° and smaller than 360°, the feedback gain Ka is set to be smaller as the angle θ of the third arm 14 is closer to 360° (0°). In addition, generally, the operation range of an arm of a robot is about 45° to 315°. However, the invention has all robots in which the operation range of the arm is within a range of 0° to 360° as targets thereof. Accordingly, in the present specification, a case where the operation range of the arm of the robot is 0° to 360° will be described.

With respect to the reason for setting the feedback gain Ka as mentioned above, first, when the angle θ of the third arm 14 is 180°, the third arm 14 is in a state (hereinafter simply referred to as an "extended state" and an "extended posture") where the third arm 14 is extended with respect to the second arm 13. When the angle θ of the third arm 14 is 180°, the control of the robot 1 is most stable, but the inertia moment of the third arm 14 around the rotation axis O2 is the largest and vibration is the largest. Thus, the effect of suppressing vibration can be enhanced by setting the feedback gain Ka to be large.

Additionally, when the angle θ of the third arm 14 is 0°) (360° (practically 45° or 315°), the third arm 14 is most largely curved with respect to the second arm 13. When the angle θ of the third arm 14 is 0°) (360° (practically 45° or) 315°, the inertia moment of the third arm 14 around the second rotation axis O2 is the smallest, the control is most unstable, and vibration occurs easily. Thus, the vibration in the robot 1 can be prevented and control can be stabilized by setting the feedback gain Ka to be small. In this case, since the inertia moment is small and the vibration in the robot 1 is small from the first, vibration does not become large even if the feedback gain Ka is lowered.

In addition, when the angle θ of the third arm 14 is within a range of being equal to or larger than 0° and smaller than 180°, the control of the robot 1 is stabilized as the angle θ of the third arm 14 is closer to 180°, the inertia moment of the third arm 14 around the rotation axis O2 is large, and vibration is large. That is, as the angle θ of the third arm 14 is closer to 0°, the control of the robot 1 is unstable, the inertia moment of the third arm 14 around the rotation axis O2 is small, and vibration is small.

Additionally, when the angle θ of the third arm 14 is within a range of being equal to or larger than 180° and smaller than 360°, the control of the robot 1 is stabilized as the angle θ of the third arm 14 is closer to 180°, the inertia moment of the third arm 14 around the rotation axis O2 is large, and vibration is large. That is, as the angle θ of the third arm 14 is closer to 360°, the control of the robot 1 is unstable, the inertia moment of the third arm 14 around the rotation axis O2 is small, and vibration is small.

In this way, in the robot 1, by adjusting the feedback gain Ka according to the posture of the third arm 14, vibration can be reliably suppressed while stabilizing control. That is, the compatibility between the suppression of vibration and the stability of control can be achieved.

In addition, the feedback gains Ka in the drive source controllers 201 and 202 are preferably set to be smaller than 1, respectively.

If the reason is representatively described in the first drive source controller 201 and the feedback gain Ka is set to 1, the angular velocity ωm1 of the first drive source 401 detected and obtained by the first angle sensor 411, and the component of the angular velocity of the first drive source 401 detected and obtained by the first angle sensor 411 in the correction value Ka·ωm1s is offset in the adder 601. Accordingly, the component of the angular velocity of the first drive source 401 detected and obtained by the first angle sensor 411 in the angular velocity feedback value ωfb becomes 0, and control becomes unstable.

Additionally, if the feedback gain Ka is set to be larger than 1, the component of the angular velocity of the first drive source 401 detected and obtained by the first angle sensor 411 in the angular velocity feedback value ωfb becomes negative, the component of the angular velocity is positively fed back, and control becomes unstable.

In addition, for example, a correction value calculator (not shown) that multiplies the angular velocity ωm1 of the first drive source 401 detected and obtained by the first angle sensor 411 by a gain (feedback gain) Kb that is a predetermined factor, obtains a correction value Kb·ωm1, and outputs the correction value Kb·ωm1 to the adder 601 may be provided between the angular velocity calculator 561 and the adder 601. In this case, from the above reason, the feedback gain Ka is preferably set to be smaller than the feedback gain Kb. In this case, the feedback gain Ka can be set to be equal to or larger than 1 depending on the value of the feedback gain Kb. In addition, a case where the correction value calculator is not provided between the angular velocity calculator 561 and an adder 601 with respect to the value of a feedback gain Ka will be representatively described below.

Next, adjustment of the feedback gain Ka in the second drive source controller 202 will be described.

In addition, cases where the feedback gains Ka are set in a case where the angle θ of the third arm 14 is smaller than θ1, a case where the angle is equal to or larger than θ1 and smaller than θ2, a case where the angle is equal to or larger than θ2 and smaller than θ3, a case where the angle is equal to or larger than θ3 and smaller than θ4, and a case where the angle is equal to or larger than θ4 (θ1<θ2<θ3<θ4) will be representatively described here, respectively.

As shown in FIG. 11, first, the second drive source controller 202 detects the rotation angle of the third drive source 403 by the third angle sensor 413 via the third drive source controller 203 (Step S101). That is, the third drive source controller 203 counts the number of pulses input from the third angle sensor 413 and obtains the rotation angle of the third drive source 403 according to the counted value, and the second drive source controller 202 acquires information on the rotation angle of the third drive source 403.

Next, the angle θ of the third arm 14 is obtained on the basis of the rotation angle of the third drive source 403 (Step S102).

Next, it is determined whether or not the angle θ of the third arm 14 is smaller than θ1 (Step S103). Then, when the angle θ of the third arm 14 is smaller than θ1, the feedback gain Ka is set to Ka1 (Step S104). In addition, since the operation range of the third arm 14 is set to, for example, 45° to 315° in the present embodiment, it is determined in Step S103 whether or not the angle θ of the third arm 14 is equal to or larger than 45° and smaller than θ1.

Additionally, when the angle θ of the third arm 14 is not smaller than θ1 in Step S103, it is determined whether or not the angle θ of the third arm 14 is equal to or larger than θ1 and smaller than θ2 (Step S105), and when the angle θ of the third arm 14 is equal to or larger than θ1 and smaller than θ2 in Step S105, the feedback gain Ka is set to Ka2 (Step S106).

Additionally, when the angle θ of the third arm 14 is not equal to or larger than θ1 and smaller than θ2 in Step S105, it is determined whether or not the angle θ of the third arm 14 is equal to or larger than θ2 and smaller than θ3 (Step S107), and when the angle θ of the third arm 14 is equal to or larger than θ2 and smaller than θ3 in Step S107, the feedback gain Ka is set to Ka3 (Step S108).

Additionally, when the angle θ of the third arm 14 is not equal to or larger than θ2 and smaller than θ3 in Step S107, it is determined whether or not the angle θ of the third arm 14 is equal to or larger than θ3 and smaller than θ4 (Step S109), and when the angle θ of the third arm 14 is equal to or larger than θ3 and smaller than θ4 in Step S109, the feedback gain Ka is set to Ka4 (Step S110).

Additionally, when the angle θ of the third arm 14 is not equal to or larger than θ3 and smaller than θ4 in Step S109, it is determined whether or not the angle θ of the third arm 14 is equal to or larger than 84 (Step S111), and when the angle θ of the third arm 14 is equal to or larger than θ4 in Step S111, the feedback gain Ka is set to Ka5 (Step S112). In addition, as mentioned above, since the operation range of the third arm 14 is set to, for example, 45° to 315° in the present embodiment, it is determined in Step S111 whether or not the angle θ of the third arm 14 is equal to or larger than θ4 and equal to or smaller than 315°.

The above respective steps are executed for every control cycle, and return to Step S101 is made again after Steps S104, S106, S108, S110, and S112. Then, Step S101 and the subsequent steps are executed.

In addition, Ka1<Ka2<Ka3>Ka4>Ka5 is established. Additionally, Ka1 and Ka5 may be the same or different. Additionally, Ka2 and Ka4 may be the same or different.

Here, although θ1 is appropriately set according to terms and conditions and is not particularly limited, θ1 is preferably from 70° to 110° and more preferably from 90° to 100°. As one example, θ1 is set to, for example, 90°.

Additionally, although θ2 is appropriately set according to terms and conditions and is not particularly limited, θ2 is preferably from 115° to 155° and more preferably from 125° to 145°. As one example, θ2 is set to, for example, 135°.

Here, although θ3 is appropriately set according to terms and conditions and is not particularly limited, θ3 is preferably from 205° to 245° and more preferably from 215° to 235°. As one example, θ3 is set to, for example, 225°.

Additionally, although θ4 is appropriately set according to terms and conditions and is not particularly limited, θ4 is preferably from 250° to 290° and more preferably from 260° to 280°. As one example, θ4 is set to, for example, 270°.

Accordingly, the vibration in the robot can be more reliably suppressed while stabilizing control.

When the angle θ is smaller than θ1, the feedback gain Ka is set to Ka1 as mentioned above. Ka1 is preferably from 0 to 0.3 and more preferably from 0 to 0.2.

Additionally, when the angle θ is equal to or larger than θ1 and smaller than θ2, the feedback gain Ka is set to Ka2 as mentioned above. Ka2 is preferably from 0.1 to 0.5 and more preferably from 0.2 to 0.4.

Additionally, when the angle θ is equal to or larger than θ2 and smaller than θ3, the feedback gain Ka is set to Ka3 as mentioned above. Ka3 is preferably from 0.3 to 0.7 and more preferably from 0.3 to 0.6.

Additionally, when the angle θ is equal to or larger than θ3 and smaller than θ4, the feedback gain Ka is set to Ka4 as mentioned above. Ka4 is preferably from 0.1 to 0.5 and more preferably from 0.2 to 0.4.

Additionally, when the angle θ is equal to or larger than θ4, the feedback gain Ka is set to Ka5 as mentioned above. Ka5 is preferably from 0 to 0.3 and more preferably from 0 to 0.2.

Accordingly, the vibration in the robot can be more reliably suppressed while stabilizing control.

As described above, according to the robot 1, the vibration in the robot 1 can be easily and reliably suppressed.

First, in the control of the robot 1, huge calculation is unnecessary, and thereby, response speed in the control of the robot 1 can be increased, and the configuration of the control device 20 can be simplified.

Additionally, in the control of the robot 1, calculation in which a singular point is present is unnecessary. Thus, the control of the robot 1 can be reliably performed, and thereby, vibration can be reliably suppressed.

Additionally, since the control of suppressing vibration is performed on the second drive source 402 that drives the second arm 13, using the detection result of the second (a) inertia sensor 32a installed at the third arm 14 on the tip side where a larger vibration than the second arm 13 is generated, the effect of suppressing the vibration in the robot 1 can be enhanced. Additionally, the effect of suppressing the vibration in the robot 1 can be enhanced by controlling the operation of the second drive source 402 that rotates the second arm 13 closer to the base end side than the third arm 14.

Additionally, since the inertia sensors 31 and 32a are installed at the first arm 12 and the third arm 14, respectively, and the first rotation axis O1 for the rotation of the first arm 12, the second rotation axis O2 for the rotation of the second arm 13, and the third rotation axis O3 for the rotation of the third arm 14 are made orthogonal to each other, the angular velocities of the first arm 12 and the third arm 14 can be detected as simple rotational components in which these angular velocities are not mixed. Hence, since control is performed by the calculation using these angular velocities, the vibration in the robot 1 can be more easily, accurately, and reliably suppressed.

In addition, since the first rotation axis O1 for the rotation of the first arm 12, the second rotation axis O2 for the rotation of the second arm 13, and the third rotation axis O3 for the rotation of the third arm 14 are made orthogonal to each other, the angular velocities of the first arm 12 and the third arm 14 can be detected as simple rotational components in which these angular velocities are not mixed. Since the rotational components with no mixture of these angular velocities are multiplied by feedback gains, respectively, the respective rotational components can be corrected with high precision.

Additionally, by adjusting the feedback gain Ka according to the posture of the third arm 14 in this way, vibration can be reliably suppressed while stabilizing control.

In addition, in the present embodiment, the angle θ of the third arm 14 is divided into five ranges. However, the invention is not limited to this, and the angle θ may be divided into, for example, two, three, four, or six or more ranges. Additionally, continuous feedback gain Ka may be made correspond to an angle θ that is not gradual but continuous.

Additionally, other specific examples of Ka1 to Ka5 are shown below.

The specific examples are obtained in consideration of a case where the vibration angular velocity ωA2s has an opposite phase. When the vibration angular velocity ωA2s has an opposite phase, the vibration angular velocity can be converted into a normal phase by making the feedback gain Ka negative.

First, Ka1 is preferably from −0.2 to 0.3 and more preferably from −0.1 to 0.1.

Additionally, Ka2 is preferably from 0.1 to 0.4 and more preferably from 0.1 to 0.3.

Additionally, Ka3 is preferably from 0.3 to 0.7 and more preferably from 0.3 to 0.6.

Additionally, Ka4 is preferably from 0.1 to 0.4 and more preferably from 0.1 to 0.3.

Additionally, Ka5 is preferably from −0.2 to 0.3 and more preferably from −0.1 to 0.1.

Second Embodiment

A second embodiment will be described below mainly regarding the differences from the aforementioned first embodiment, and the description of the same matters will be omitted.

In the robot 1 of the second embodiment, the second drive source controller 202 adjusts the feedback gain Ka on the basis of tip load mass in the tip portion of the robot 1, that is, the tip portion of the wrist 16, in the feedback control.

This tip load mass is the total mass of the manipulator mounted on the tip portion of the wrist 16 that is an arm closest to the tip side and an object to be gripped by the manipulator. That is, the tip load mass is the total mass of the manipulator and the object gripped by the manipulator when the manipulator is gripping the object and is the mass of the manipulator when the manipulator is not gripping the object.

In the present embodiment, both the mass of the manipulator and the mass of the object gripped by the manipulator are already known, and the masses are stored in advance in a storage (not shown) of the control device 20. Additionally, the control device 20 grasps whether or not the manipulator is gripping the object. Accordingly, the control device 20 always grasps the tip load mass of the robot 1. In addition, the object to be gripped by the manipulator may be a plurality of kinds of objects having different masses.

Additionally, the second drive source controller 202 sets the feedback gain Ka to be smaller as the tip load mass becomes larger.

This is because, as the tip load mass is larger, the vibration in the robot 1 is smaller but the control is unstable and vibration occurs easily. Thus, by setting the feedback gain Ka to be small, the vibration in the robot 1 can be prevented, and the control can be stabilized.

In other words, since the control of the robot 1 is stable as the tip load mass is smaller, the effect of suppressing vibration can be enhanced by setting the feedback gain Ka to be large.

Next, adjustment of the feedback gain Ka will be described.

Additionally, cases where the feedback gains Ka are set in combinations of each of a case where the angle θ of the third arm. 14 is smaller than θ1, a case where the angle is equal to or larger than θ1 and smaller than θ2, a case where the angle is equal to or larger than θ2 and smaller than θ3, a case where the angle is equal to or larger than θ3 and smaller than θ4, and a case where the angle is equal to or larger than θ4 (θ1<θ2<θ3<θ4) and each of a case where the tip load mass is 1 kg, a case where the tip load mass is 3 kg, and a case where the tip load mass is 5 kg will be representatively described here, respectively.

First, when the angle θ is smaller than θ1 and the tip load mass is 1 kg, the feedback gain Ka is preferably from 0 to 0.4 and more preferably from 0.1 to 0.3.

Additionally, when the angle θ is smaller than θ1 and the tip load mass is 3 kg, the feedback gain Ka is preferably from 0 to 0.3 and more preferably from 0 to 0.2.

Additionally, when the angle θ is smaller than θ1 and the tip load mass is 5 kg, the feedback gain Ka is preferably from −0.2 to 0.2 and more preferably from −0.1 to 0.

Additionally, when the angle θ is equal to or larger than θ1 and smaller than θ2 and the tip load mass is 1 kg, the feedback gain Ka is preferably from 0.1 to 0.5 and more preferably from 0.2 to 0.4.

Additionally, when the angle θ is equal to or larger than θ1 and smaller than θ2 and the tip load mass is 3 kg, the feedback gain Ka is preferably from 0.1 to 0.5 and more preferably from 0.2 to 0.3.

Additionally, when the angle θ is equal to or larger than θ1 and smaller than θ2 and the tip load mass is 5 kg, the feedback gain Ka is preferably from 0 to 0.4 and more preferably from 0 to 0.3.

Additionally, when the angle θ is equal to or larger than θ2 and smaller than θ3 and the tip load mass is 1 kg, the feedback gain Ka is preferably from 0.3 to 0.7 and more preferably from 0.4 to 0.6.

Additionally, when the angle θ is equal to or larger than θ2 and smaller than θ3 and the tip load mass is 3 kg, the feedback gain Ka is preferably from 0.3 to 0.7 and more preferably from 0.3 to 0.6.

Additionally, when the angle θ is equal to or larger than θ2 and smaller than θ3 and the tip load mass is 5 kg, the feedback gain Ka is preferably from 0.3 to 0.7 and more preferably from 0.3 to 0.6.

Additionally, when the angle θ is equal to or larger than θ3 and smaller than θ4 and the tip load mass is 1 kg, the feedback gain Ka is preferably from 0.1 to 0.5 and more preferably from 0.2 to 0.4.

Additionally, when the angle θ is equal to or larger than θ3 and smaller than θ4 and the tip load mass is 3 kg, the feedback gain Ka is preferably from 0.1 to 0.5 and more preferably from 0.2 to 0.3.

Additionally, when the angle θ is equal to or larger than θ3 and smaller than θ4 and the tip load mass is 5 kg, the feedback gain Ka is preferably from 0 to 0.4 and more preferably from 0 to 0.3.

Additionally, when the angle θ is equal to or larger 84 and the tip load mass is 1 kg, the feedback gain Ka is preferably from 0 to 0.4 and more preferably from 0.1 to 0.3.

Additionally, when the angle θ is equal to or larger than θ4 and the tip load mass is 3 kg, the feedback gain Ka is preferably from 0 to 0.3 and more preferably from 0 to 0.2.

Additionally, when the angle θ is equal to or larger than θ4 and the tip load mass is 5 kg, the feedback gain Ka is preferably from −0.2 to 0.2 and more preferably from −0.1 to 0.

Accordingly, the vibration in the robot can be more reliably suppressed while stabilizing control.

According to the robot 1, the same effects as the aforementioned first embodiment are obtained.

In the robot 1, by adjusting the feedback gain Ka according to the posture of the third arm 14 and the tip load mass in this way, vibration can be more reliably suppressed while stabilizing control.

Third Embodiment

Figure 12:
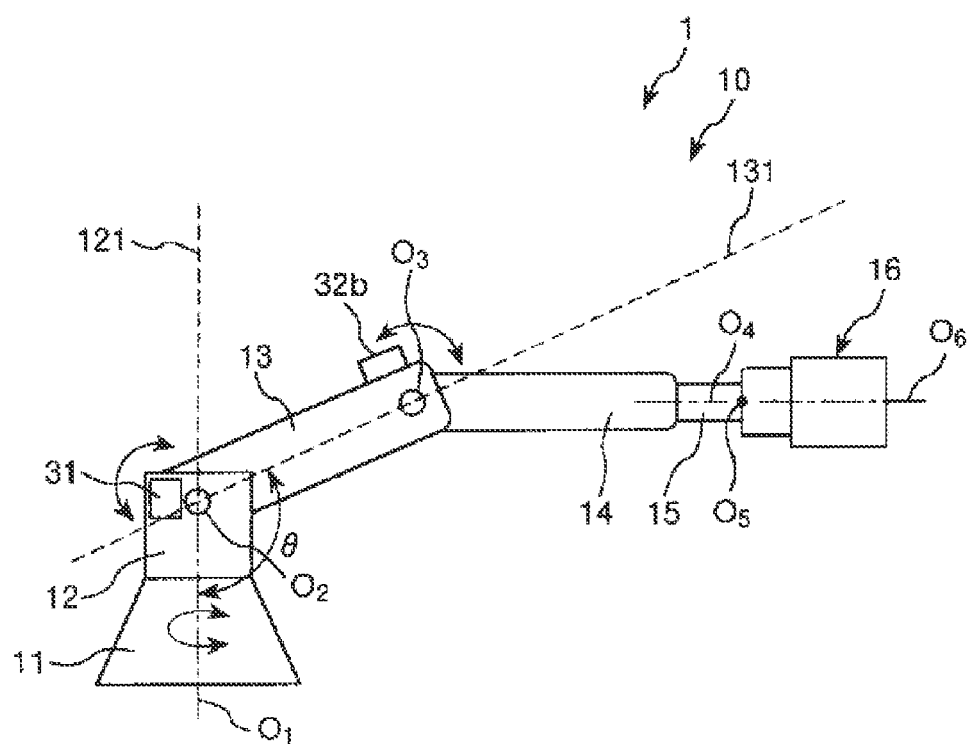
FIG. 12 is a schematic view showing a third embodiment of the robot of the invention.
Figure 13:
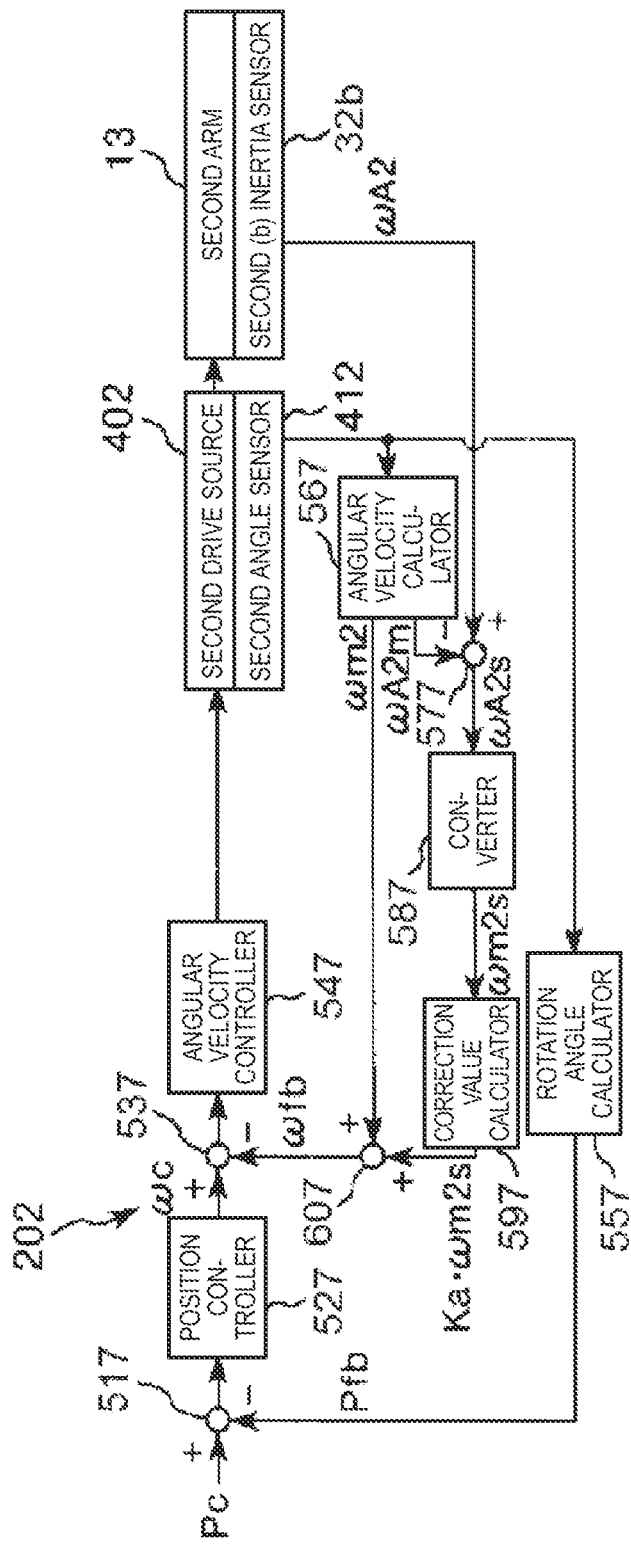
FIG. 13 is a block diagram of main portions of the robot shown in FIG. 12.
Figure 14:
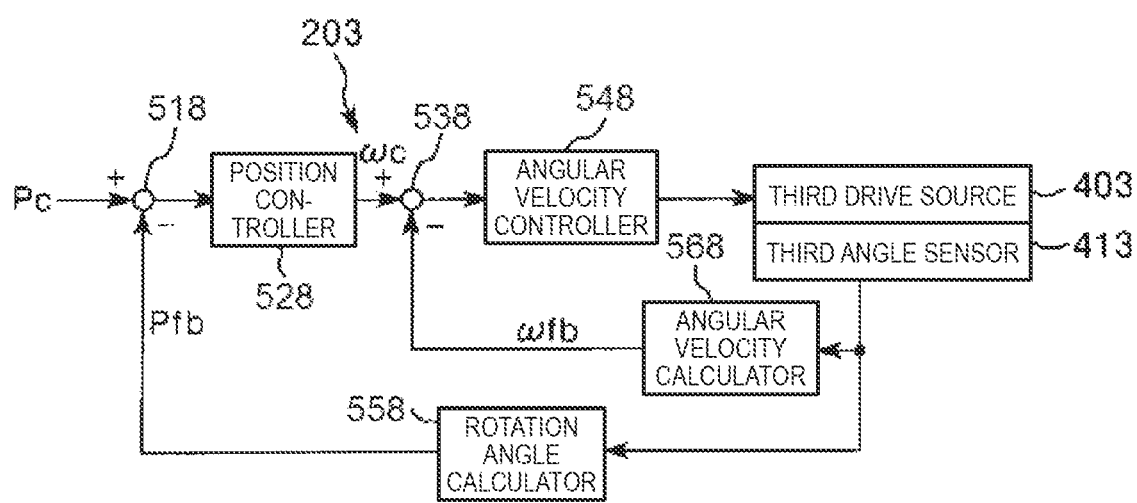
FIG. 14 is a block diagram of main portions of the robot shown in FIG. 12.
Figure 15:
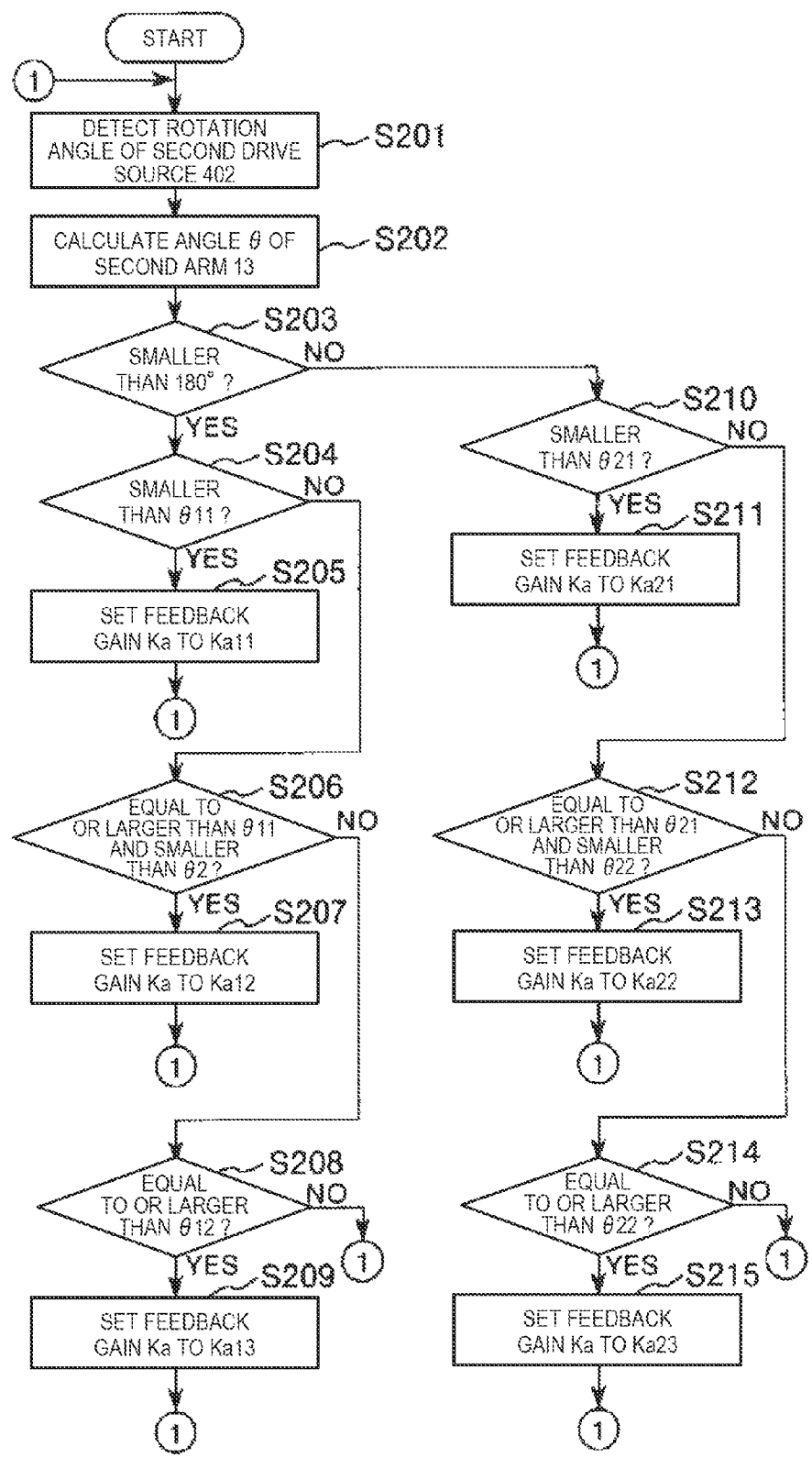
FIG. 15 is a flowchart showing the control operation of a control device of the robot shown in FIG. 12.

FIG. 12 is a schematic view showing a third embodiment of the robot of the invention. FIGS. 13 and 14 are block diagrams of main portions of the robot shown in FIG. 12, respectively. FIG. 15 is a flowchart showing the control operation of the control device of the robot shown in FIG. 1.

In addition, in the following, for the convenience of description, the upper side in FIG. 12 is referred to as "upper" and "upside" and the lower side is referred to as "lower" and "downside". Additionally, the base side in FIG. 12 is referred to as a "base end", and the opposite side is referred to as a "tip". Additionally, the rotation axes O2 and θ3 are shown in an exaggerated manner in FIG. 12, respectively. Additionally, inertia sensors 31 and 32b are shown outside arms 12 and 13 in FIG. 12, respectively, in order to clarify the presence of the sensors.

The third embodiment will be described below mainly regarding differences from the aforementioned first embodiment, and the description of the same matters will be omitted.

As shown in FIG. 12, in the robot 1 of the third embodiment, an inertia sensor is not installed at the third arm 14, and a second (b) inertia sensor 32b is installed at the second arm 13. The second (b) inertia sensor 32b detects the angular velocity of the second arm 13 around the rotation axis O2. Although the installation position of the second (b) inertia sensor 32b at the second arm 13 is not particularly limited, a tip portion of the second arm 13 is preferable. In the present embodiment, the second (b) inertia sensor 32b is installed at the tip portion inside the second arm 13. Since the vibration in the second arm 13 becomes the maximum at the tip portion of the second arm, this can more reliably suppress the vibration in the robot 1. In addition, it is obvious that the second (b) inertia sensor 32b may be installed at a base end portion of the second arm 13.

Additionally, the second (b) inertia sensor 32b is not particularly limited, and in the present embodiment, for example, a gyroscope sensor or the like can be used.

Here, in the robot 1, in order to suppress the vibration in the first arm 12 and the second arm 13, the first inertia sensor 31 and the second (b) inertia sensor 32b are installed at both the first arm 12 and the second arm 13 as mentioned above, and the operation of the drive sources 401 and 402 is controlled on the basis of detection results of the first inertia sensor 31 and the second (b) inertia sensor 32b. Accordingly, the vibration in the first arm 12 and the second arm 13 can be reliably suppressed, and thereby, the vibration in the whole robot 1 can be reliably suppressed.

Additionally, in the robot 1, the second drive source controller 202 of the control device 20 is different from that of the first embodiment.

As shown in FIG. 13, the second drive source controller 202 has a subtractor 517, a position controller 527, a subtractor 537, an angular velocity controller 547, a rotation angle calculator 557, an angular velocity calculator 567, a subtractor 577, a converter 587, a correction value calculator 597, and an adder 607.

Additionally, as shown in FIG. 14, the third drive source controller 203 has a subtractor 518, a position controller 528, a subtractor 538, an angular velocity controller 548, a rotation angle calculator 558, and an angular velocity calculator 568. The second drive source controller 202 will be described below.

As shown in FIG. 13, in addition to a position command Pc of the second drive source 402, detection signals are input from the second angle sensor 412 and the second (b) inertia sensor 32b, respectively, to the second drive source controller 202. The second drive source controller 202 drives the second drive source 402 by a feedback control using the respective detection signals so that a rotation angle (position feedback value Pfb) of the second drive source 402 calculated from the detection signal of the second angle sensor 412 becomes the position command Pc and an angular velocity feedback value ωfb to be described below becomes an angular velocity command ωc to be described below.

That is, the position command Pc is input to the subtractor 517 of the second drive source controller 202, and the position feedback value Pfb to be described below is input from the rotation angle calculator 557. In the rotation angle calculator 557, the number of pulses input from the second angle sensor 412 is counted, and the rotation angle of the second drive source 402 according to the counted value is output to the subtractor 517 as the position feedback value Pfb. The subtractor 517 outputs a deviation (value obtained by subtracting the position feedback value Pfb from a targeted value of the rotation angle of the second drive source 402) between the position command Pc and the position feedback value Pfb to the position controller 527.

The position controller 527 performs predetermined calculation processing using the deviation input from the subtractor 517 and a proportional gain that is a predetermined factor, and calculates the targeted value of the angular velocity of the second drive source 402 according to the deviation. The position controller 527 outputs a signal showing the targeted value (command value) of the angular velocity of the second drive source 402 to the subtractor 537 as the angular velocity command (second angular velocity command) ωc. In addition, in the present embodiment, a proportional control (P control) is performed as the feedback control. However, the feedback control is not limited to this.

The angular velocity command ωc and the angular velocity feedback value ωfb to be described below are input to the subtractor 537. The subtractor 537 outputs a deviation (value obtained by subtracting the angular velocity feedback value ωfb from the targeted value of the angular velocity of the second drive source 402) between the angular velocity command ωc and the angular velocity feedback value ωfb to the angular velocity controller 547.

The angular velocity controller 547 performs predetermined calculation processing including integration, using the deviation input from the subtractor 537, a proportional gain that is a predetermined factor, an integration gain, or the like, thereby generating a driving signal (driving current) of the second drive source 402 according to the deviation and supplying the driving signal to the motor 402M via the motor driver 302. In addition, in the present embodiment, the PI control is performed as the feedback control. However, the feedback control is not limited to this.

In this way, the feedback control is performed and the driving current of the second drive source 402 is controlled so that the position feedback value Pfb is as equal to the position command Pc as possible and the angular velocity feedback value ωfb is as equal to the angular velocity command ωc as possible. In addition, since the rotation axis O2 is orthogonal to the rotation axis O1, the rotation axis is not influenced by the operation or vibration of the first arm 12, and the operation of the second drive source 402 can be controlled independently from the first drive source 401.

Next, the angular velocity feedback value ωfb in the second drive source controller 202 will be described.

In an angular velocity calculator 567, an angular velocity ωm2 of the second drive source 402 is calculated on the basis of the frequency of a pulse signal input from the second angle sensor 412, and the angular velocity ωm2 is output to an adder 602.

Additionally, in the angular velocity calculator 567, an angular velocity ωA2m of the second arm 13 around the rotation axis O2 is calculated on the basis of the frequency of the pulse signal input from the second angle sensor 412, and the angular velocity ωA2m is output to the subtractor 577. In addition, the angular velocity ωA2m is a value obtained by dividing the angular velocity ωm2 by a reduction ratio between the motor 402M of the second drive source 402 and the second arm 13, that is, in the joint 172.

Additionally, the second (b) inertia sensor 32b detects the angular velocity of the second arm 13 around the rotation axis O2. A detection signal of the second (b) inertia sensor 32b, that is, an angular velocity ωA2 of the second arm 13 around the rotation axis O2 detected by the second (b) inertia sensor 32b is output to the subtractor 577. In addition, since the rotation axis O2 is orthogonal to the rotation axis θ1, the angular velocity of the second arm 13 around the rotation axis O2 can be easily and reliably obtained without being influenced by the operation or vibration of the first arm 12.

The angular velocity ωA2 and the angular velocity ωA2m are input to the subtractor 577, and the subtractor 577 outputs a value ωA2s (=ωA2−ωA2m) obtained by subtracting the angular velocity ωA2m from the angular velocity ωA2 to the converter 587. The value ωA2s is equivalent to a vibration component (vibration angular velocity) of the angular velocity of the second arm 13 around the rotation axis O2. Hereinafter, ωA2s is referred to as a vibration angular velocity. In the present embodiment, a feedback control is performed in which the vibration angular velocity ωA2s (in detail, an angular velocity ωm2s in the motor 402M that is a value generated on the basis of the vibration angular velocity ωA2s) is multiplied by a gain Ka to be described below and is returned to the input side of the second drive source 402. Specifically, a feedback control is performed on the second drive source 402 so that the vibration angular velocity ωA2s becomes as close to 0 as possible. Accordingly, the vibration in the robot 1 can be suppressed. In addition, the angular velocity of the second drive source 402 is controlled in the feedback control.

The converter 587 converts the vibration angular velocity ωA2s into the angular velocity ωm2s in the second drive source 402, and outputs the angular velocity ωm2s to the correction value calculator 597. This conversion can be obtained by multiplying the vibration angular velocity ωA2s by the reduction ratio between the motor 402M of the second drive source 402 and the second arm 13, that is, in the joint 172.

The correction value calculator 597 multiplies the angular velocity ωm2s by a gain (feedback gain) Ka that is a predetermined factor, obtains a correction value (second correction component) Ka·ωm2s, and outputs the correction value Ka·ωm2s to the adder 607. In addition, the gain Ka in the second drive source controller 202 and the gain Ka in the first drive source controller 201 may be the same or may be different.

The angular velocity ωm2 and the correction value Ka·ωm2s are input to the adder 607. The adder 607 outputs an additional value of the angular velocity ωm2 and the correction value Ka·ωm2s to the subtractor 537 as the angular velocity feedback value ωfb. In addition, the subsequent operation is the same as that of the first embodiment.

Since the third drive source controller 203 shown in FIG. 14 is the same as that of the first embodiment except that calculation and output of the angular velocity ωA3m is not performed, the description thereof is omitted.

Here, the robot 1 has an angle detection unit that detects the angle θ (hereinafter simply referred to as "angle θ of the second arm 13", "angle θ of the arm 13", and "angle θ") formed between an axis (central axis) 121 (rotation axis O1) of the first arm 12, and an axis (central axis) 131 of the second arm 13 (refer to FIG. 12), as a posture detection unit that detects the posture of the second arm 13 with the first arm 12 as a reference. In the present embodiment, the angle detection unit is constituted by the second angle sensor 412 and the control device 20. That is, the rotation angle calculator 557 of the second drive source controller 202 of the control device 20 counts the number of pulses input from the second angle sensor 412, obtains the rotation angle of the second drive source 402 according to the counted value, and thereby, obtains the current angle θ of the second arm 13.

The first drive source controller 201 (posture detection unit) adjusts (derives) a feedback gain Ka on the basis of the detection result of the angle detection unit, that is, the detected angle θ of the second arm 13, in the aforementioned feedback control.

In this case, the first drive source controller 201 sets the feedback gain Ka to be larger as the angle θ of the second arm 13 is closer to 90° when the angle θ of the second arm 13 is within a range of being equal to or larger than 0° and smaller than 180°. That is, when the angle θ of the second arm 13 is within a range of being equal to or larger than 0° and smaller than 90°, the feedback gain Ka is set to be smaller as the angle θ of the second arm 13 is closer to 0°, and similarly, when the angle θ of the second arm 13 is within a range of being equal to or larger than 90° and smaller than 180°, the feedback gain Ka is set to be smaller as the angle θ of the second arm 13 is closer to 180°.

Additionally, when the angle θ of the second arm 13 is within a range of being equal to or larger than 180° and smaller than 360°, the feedback gain Ka is set to be larger as the angle θ of the second arm 13 is closer to 270°. That is, when the angle θ of the second arm 13 is within a range of being equal to or larger than 180° and smaller than 270°, the feedback gain Ka is set to be smaller as the angle θ of the second arm 13 is closer to 180°, and similarly, when the angle θ of the second arm 13 is within a range of being equal to or larger than 270° and smaller than 360°, the feedback gain Ka is set to be smaller as the angle θ of the second arm 13 is closer to 360° (0').

First, this is because, when the angle θ of the second arm 13 is 90° or 270°, the control of the robot 1 is most stable, but the inertia moment of the second arm 13 around the rotation axis O1 is the largest and vibration is the largest. Thus, the effect of suppressing vibration can be enhanced by setting the feedback gain Ka to be large.

Additionally, when the angle θ of the second arm 13 is 0° or 180°, the inertia moment of the second arm 13 around the first rotation axis O1 is the smallest, the control is most unstable, and vibration occurs easily. Thus, the vibration in the robot 1 can be prevented and control can be stabilized by setting the feedback gain Ka to be small. In this case, since the inertia moment is small and the vibration in the robot 1 is small from the first, vibration does not become large even if the feedback gain Ka is lowered.

In addition, when the angle θ of the second arm 13 is within a range of being equal to or larger than 0° and smaller than 90°, the control of the robot 1 is stabilized as the angle θ of the second arm 13 is closer to 90°, the inertia moment of the second arm 13 around the rotation axis O1 is large, and vibration is large. That is, as the angle θ of the second arm 13 is closer to 0°, the control of the robot 1 is unstable, the inertia moment of the second arm 13 around the rotation axis O1 is small, and vibration is small.

Additionally, when the angle θ of the second arm 13 is within a range of being equal to or larger than 90° and smaller than 180°, the control of the robot 1 is stabilized as the angle θ of the second arm 13 is closer to 90°, the inertia moment of the second arm 13 around the rotation axis O1 is large, and vibration is large. That is, as the angle θ of the second arm 13 is closer to 180°, the control of the robot 1 is unstable, the inertia moment of the second arm 13 around the rotation axis O1 is small, and vibration is small.

Additionally, when the angle θ of the second arm 13 is within a range of being equal to or larger than 180° and smaller than 270°, the control of the robot 1 is stabilized as the angle θ of the second arm 13 is closer to 270°, the inertia moment of the second arm 13 around the rotation axis O1 is large, and vibration is large. That is, as the angle θ of the second arm 13 is closer to 180°, the control of the robot 1 is unstable, the inertia moment of the second arm 13 around the rotation axis O1 is small, and vibration is small.

Additionally, when the angle θ of the second arm 13 is within a range of being equal to or larger than 270° and smaller than 360°, the control of the robot 1 is stabilized as the angle θ of the second arm 13 is closer to 270°, the inertia moment of the second arm 13 around the rotation axis O1 is large, and vibration is large. That is, as the angle θ of the second arm 13 is closer to 360°, the control of the robot 1 is unstable, the inertia moment of the second arm 13 around the rotation axis O1 is small, and vibration is small.

In this way, in the robot 1, by adjusting the feedback gain Ka according to the posture of the second arm 13, vibration can be reliably suppressed while stabilizing control. That is, the compatibility between the suppression of vibration and the stability of control can be achieved.

Next, adjustment of the feedback gain Ka in the first drive source controller 201 will be described.

In addition, cases where the feedback gains Ka are set, respectively, in a case where the angle θ of the second arm 13, a case where the angle is smaller than θ11, a case where the angle is equal to or larger than θ11 and smaller than θ12, and a case where the angle is equal to or larger than θ12 (θ11<θ12) within a range in which the angle θ of the second arm 13 is equal to or larger than 0° and smaller than 180°, and similarly, cases where the feedback gains Ka are set, respectively, in a case where the angle θ of the second arm 13 is smaller than θ21, a case where the angle is equal to or larger than θ21 and smaller than θ22, and a case where the angle is equal to or larger than θ22 (θ21<θ22) within a range in which the angle θ of the second arm 13 is equal to or larger than 180° and smaller than 360° will be representatively described here.

As shown in FIG. 15, first, the second drive source controller 202 detects the rotation angle of the second drive source 402 by the second angle sensor 412 (Step S201). That is, the number of pulses input from the second angle sensor 412 is counted, and the rotation angle of the second drive source 402 according to the counted value is obtained.

Next, the angle θ of the second arm 13 is obtained on the basis of the rotation angle of the second drive source 402 (Step S202).

Additionally, it is determined whether or not the angle θ of the second arm 13 is smaller than 180° (Step S203). Then, when the angle θ of the second arm 13 is smaller than 180°, it is determined whether or not the angle θ of the second arm 13 is smaller than θ11(Step S204), and when the angle θ of the second arm 13 is smaller than θ11, the feedback gain Ka is set to Ka11 (Step S205). In addition, since the operation range of the second arm 13 is set to, for example, 50° to 310° in the present embodiment, it is determined in Step S204 whether or not the angle θ of the second arm 13 is equal to or larger than 50° and smaller than θ11.

Additionally, when the angle θ of the second arm 13 is not smaller than θ11 in Step S204, it is determined whether or not the angle θ of the second arm 13 is equal to or larger than θ11 and smaller than θ12 (Step S206), and when the angle θ of the second arm 13 is equal to or larger than θ11 and smaller than θ12 in Step S204, the feedback gain Ka is set to Ka12 (Step S207).

Additionally, when the angle θ of the second arm 13 is not equal to or larger than θ11 and smaller than θ12 in Step S206, it is determined whether or not the angle θ of the second arm 13 is equal to or larger than θ12 (Step S208), and when the angle θ of the second arm 13 is equal to or larger than θ12 in Step S208, the feedback gain Ka is set to Ka13 (Step S209).

Additionally, when the angle θ of the second arm 13 is not smaller than 180° in Step S204, it is determined whether or not the angle θ of the second arm 13 is smaller than θ21 (Step S210), and when the angle θ of the second arm 13 is smaller than θ21 in Step S210, the feedback gain Ka is set to Ka21 (Step S211).

Additionally, when the angle θ of the second arm 13 is not smaller than θ21 in Step S210, it is determined whether or not the angle θ of the second arm 13 is equal to or larger than θ21 and smaller than θ22 (Step S212), and when the angle θ of the second arm 13 is equal to or larger than θ21 and smaller than θ22 in Step S212, the feedback gain Ka is set to Ka22 (Step S213).

Additionally, when the angle θ of the second arm 23 is not equal to or larger than θ21 and smaller than θ22 in Step S212, it is determined whether or not the angle θ of the second arm 13 is equal to or larger than θ22 (Step S214), and when the angle θ of the second arm 13 is equal to or larger than θ22 in Step S214, the feedback gain Ka is set to Ka23 (Step S215). In addition, as mentioned above, since the operation range of the second arm 13 is set to, for example, 50° to 310° in the present embodiment, it is determined in Step S214 whether or not the angle θ of the second arm 13 is equal to or larger than θ22 and equal to or smaller than 310°.

The above respective steps are executed for every control cycle, and return to Step S201 is made again after Steps S205, S207, S209, S211, S213, and S215. Then, Step S201 and the subsequent steps are executed.

In addition, Ka11>Ka12>Ka13 and Ka21<Ka22<Ka23 are established. Additionally, Ka11 and Ka23 may be the same or different. Additionally, Ka12 and Ka22 may be the same or different. Additionally, Ka13 and Ka21 may be the same or different.

Here, although θ11 is appropriately set according to terms and conditions and is not particularly limited, θ11 is preferably from 115° to 155° and more preferably from 125° to 145°. As one example, θ11 is set to, for example, 130°.

Additionally, although θ12 is appropriately set according to terms and conditions and is not particularly limited, θ12 is preferably from 145° to 175° and more preferably from 155° to 165°. As one example, θ12 is set to, for example, 160°.

Additionally, although θ21 is appropriately set according to terms and conditions and is not particularly limited, θ21 is preferably from 185° to 215° and more preferably from 195° to 205°. As one example, θ21 is set to, for example, 200°.

Additionally, although θ22 is appropriately set according to terms and conditions and is not particularly limited, θ22 is preferably from 205° to 245° and more preferably from 215° to 235°. As one example, θ22 is set to, for example, 230°.

Accordingly, the vibration in the robot can be more reliably suppressed while stabilizing control.

When the angle θ is smaller than θ11, the feedback gain Ka is set to Ka11 as mentioned above. Ka11 is preferably from 0.2 to 0.7 and more preferably from 0.4 to 0.5.

Additionally, when the angle θ is equal to or larger than θ11 and smaller than θ12, the feedback gain Ka is set to Ka12 as mentioned above. Ka12 is preferably from 0.1 to 0.4 and more preferably from 0.2 to 0.4.

Additionally, when the angle θ is equal to or larger than θ12, the feedback gain Ka is set to Ka13 as mentioned above. Ka13 is preferably from 0 to 0.3 and more preferably from 0.1 to 0.2.

Additionally, when the angle θ is smaller than θ21, the feedback gain Ka is set to Ka21 as mentioned above. Ka21 is preferably from 0 to 0.3 and more preferably from 0.1 to 0.2.

Additionally, when the angle θ is equal to or larger than θ21 and smaller than θ22, the feedback gain Ka is set to Ka22 as mentioned above. Ka22 is preferably from 0.1 to 0.4 and more preferably from 0.2 to 0.4.

Additionally, when the angle θ is equal to or larger than θ22, the feedback gain Ka is set to Ka23 as mentioned above. Ka23 is preferably from 0.2 to 0.7 and more preferably from 0.4 to 0.5.

Accordingly, the vibration in the robot can be more reliably suppressed while stabilizing control.

According to the robot 1, the same effects as the aforementioned first embodiment are obtained.

In addition, in the present embodiment, the angle θ of the second arm 13 is divided into six ranges. However, the invention is not limited to this, and the angle θ may be divided into, for example, two, three, four, five, or seven or more ranges. Additionally, continuous feedback gain Ka may be made correspond to an angle θ that is not gradual but continuous.

Specific examples when the angle θ of the second arm 13 is divided into nine ranges are shown below. In addition, a case where the operation range of the second arm 13 is 20° to 270° will be described here.

First, when the angle θ is equal to or larger than 20° and smaller than 40°, the feedback gain Ka is preferably from 0.15 to 0.3.

Additionally, when the angle θ is equal to or larger than 40° and smaller than 60°, the feedback gain Ka is preferably from 0.3 to 0.4.

Additionally, when the angle θ is equal to or larger than 60° and smaller than 120°, the feedback gain Ka is preferably from 0.4 to 0.7.

Additionally, when the angle θ is equal to or larger than 120° and smaller than 140°, the feedback gain Ka is preferably from 0.3 to 0.4.

Additionally, when the angle θ is equal to or larger than 140° and smaller than 160°, the feedback gain Ka is preferably from 0.15 to 0.3.

Additionally, when the angle θ is equal to or larger than 160° and smaller than 200°, the feedback gain Ka is preferably from 0.05 to 0.15.

Additionally, when the angle θ is equal to or larger than 200° and smaller than 220°, the feedback gain Ka is preferably from 0.15 to 0.3.

Additionally, when the angle θ is equal to or larger than 220° and smaller than 240°, the feedback gain Ka is preferably from 0.3 to 0.4.

Additionally, when the angle θ is equal to or larger than 240° and smaller than 270°, the feedback gain Ka is preferably from 0.4 to 0.7.

Fourth Embodiment

The fourth embodiment will be described below mainly regarding differences from the aforementioned third embodiment, and the description of the same matters will be omitted.

In the robot 1 of a fourth embodiment, the second drive source controller 202 adjusts the feedback gain Ka on the basis of tip load mass in the tip portion of the robot 1, that is, the tip portion of the wrist 16, in the feedback control.

This tip load mass is the total mass of the manipulator mounted on the wrist 16 and an object to be gripped by the manipulator. That is, the tip load mass is the total mass of the manipulator and the object gripped by the manipulator when the manipulator is gripping the object and is the mass of the manipulator when the manipulator is not gripping the object.

In the present embodiment, both the mass of the manipulator and the mass of the object gripped by the manipulator are already known, and the masses are stored in advance in a storage (not shown) of the control device 20. Additionally, the control device 20 grasps whether or not the manipulator is gripping the object. Accordingly, the control device 20 always grasps the tip load mass of the robot 1. In addition, the object to be gripped by the manipulator may be a plurality of kinds of objects having different masses.

Additionally, the second drive source controller 202 sets the feedback gain Ka to be larger as the tip load mass becomes larger.

This is because, as the tip load mass is larger, the control of the robot 1 is stable, but the inertia moment of the second arm 13 around the rotation axis O1 is large and vibration is large. Thus, the effect of suppressing vibration can be enhanced by setting the feedback gain Ka to be large.

In other words, as the tip load mass is smaller, the inertia moment of the second arm 13 around the rotation axis θ1 is smaller and the vibration in the robot 1 is smaller but control is unstable and vibration occurs easily. Thus, by setting the feedback gain Ka to be small, the vibration in the robot 1 can be prevented, and control can be stabilized.

Next, adjustment of the feedback gain Ka will be described.

In addition, a case where the operation range of the second arm 13 is 50° to 310° will be described here. Additionally, cases where the feedback gains Ka are set in combinations of each of a case where the angle θ of the second arm 13 is smaller than θ11, a case where the angle is equal to or larger than θ11 and smaller than θ12, and a case where the angle is equal to or larger than θ12 (θ11<θ12) when the angle θ of the second arm 13 is equal to or larger than 50° and smaller than 180° and each of a case where the tip load mass is 1 kg, a case where the tip load mass is 3 kg, and a case where the tip load mass is 5 kg will be representatively described here, respectively.

Similarly, cases where the feedback gains Ka are set in combinations of each of a case where the angle θ of the second arm 13 is smaller than θ21, a case where the angle is equal to or larger than θ21 and smaller than θ22, and a case where the angle is equal to or larger than θ22 (θ21<θ22) when the angle θ of the second arm 13 is equal to or larger than 180° and smaller than 310° and each of a case where the tip load mass is 1 kg, a case where the tip load mass is 3 kg, and a case where the tip load mass is 5 kg will be described here, respectively.

First, when the angle θ is equal to or larger than 50° and smaller than θ11 and the tip load mass is 1 kg, the feedback gain Ka is preferably from 0.25 to 0.4.

Additionally, when the angle θ is equal to or larger than 50° and smaller than θ11 and the tip load mass is 3 kg, the feedback gain Ka is preferably from 0.35 to 0.5.

Additionally, when the angle θ is equal to or larger than 50° and smaller than 811 and the tip load mass is 5 kg, the feedback gain Ka is preferably from 0.4 to 0.7.

Additionally, when the angle θ is equal to or larger than θ11 and smaller than θ12 and the tip load mass is 1 kg, the feedback gain Ka is preferably from 0.1 to 0.25.

Additionally, when the angle θ is equal to or larger than θ11 and smaller than θ12 and the tip load mass is 3 kg, the feedback gain Ka is preferably from 0.2 to 0.4.

Additionally, when the angle θ is equal to or larger than θ11 and smaller than θ12 and the tip load mass is 5 kg, the feedback gain Ka is preferably from 0.3 to 0.6.

Additionally, when the angle θ is equal to or larger than θ12 and the tip load mass is 1 kg, the feedback gain Ka is preferably from 0.05 to 0.15.

Additionally, when the angle θ is equal to or larger than θ12 and the tip load mass is 3 kg, the feedback gain Ka is preferably from 0.1 to 0.2.

Additionally, when the angle θ is equal to or larger than θ12 and the tip load mass is 5 kg, the feedback gain Ka is preferably from 0.25 to 0.4.

Additionally, when the angle θ is smaller than θ21 and the tip load mass is 1 kg, the feedback gain Ka is preferably from 0.05 to 0.15.

Additionally, when the angle θ is smaller than θ21 and the tip load mass is 3 kg, the feedback gain Ka is preferably from 0.1 to 0.2.

Additionally, when the angle θ is smaller than θ21 and the tip load mass is 5 kg, the feedback gain Ka is preferably from 0.25 to 0.4.

Additionally, when the angle θ is equal to or larger than θ21 and smaller than θ22 and the tip load mass is 1 kg, the feedback gain Ka is preferably from 0.1 to 0.25.

Additionally, when the angle θ is equal to or larger than θ21 and smaller than θ22 and the tip load mass is 3 kg, the feedback gain Ka is preferably from 0.2 to 0.4.

Additionally, when the angle θ is equal to or larger than θ21 and smaller than θ22 and the tip load mass is 5 kg, the feedback gain Ka is preferably from 0.3 to 0.6.

Additionally, when the angle θ is equal to or larger than θ22 and smaller than 310° and the tip load mass is 1 kg, the feedback gain Ka is preferably from 0.25 to 0.4.

Additionally, when the angle θ is equal to or larger than θ22 and smaller than 310° and the tip load mass is 3 kg, the feedback gain Ka is preferably from 0.35 to 0.5.

Additionally, when the angle θ is equal to or larger than θ22 and smaller than 310° and the tip load mass is 5 kg, the feedback gain Ka is preferably from 0.4 to 0.7.

Accordingly, the vibration in the robot can be more reliably suppressed while stabilizing control.

According to the robot 1, the same effects as the aforementioned third embodiment are obtained.

In the robot 1, by adjusting the feedback gain Ka according to the posture of the second arm 13 and the tip load mass, vibration can be more reliably suppressed while stabilizing control.

In addition, the fourth embodiment can also be applied to a fifth embodiment to be described below.

Fifth Embodiment

Figure 16:
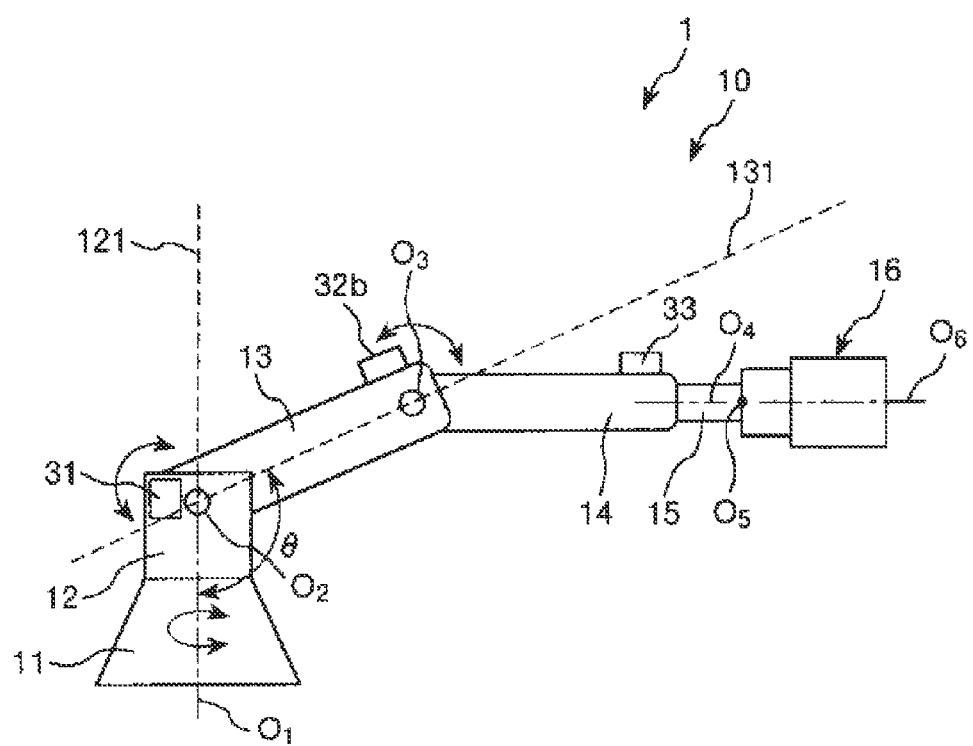
FIG. 16 is a schematic view showing a fifth embodiment of the robot of the invention.
Figure 17:
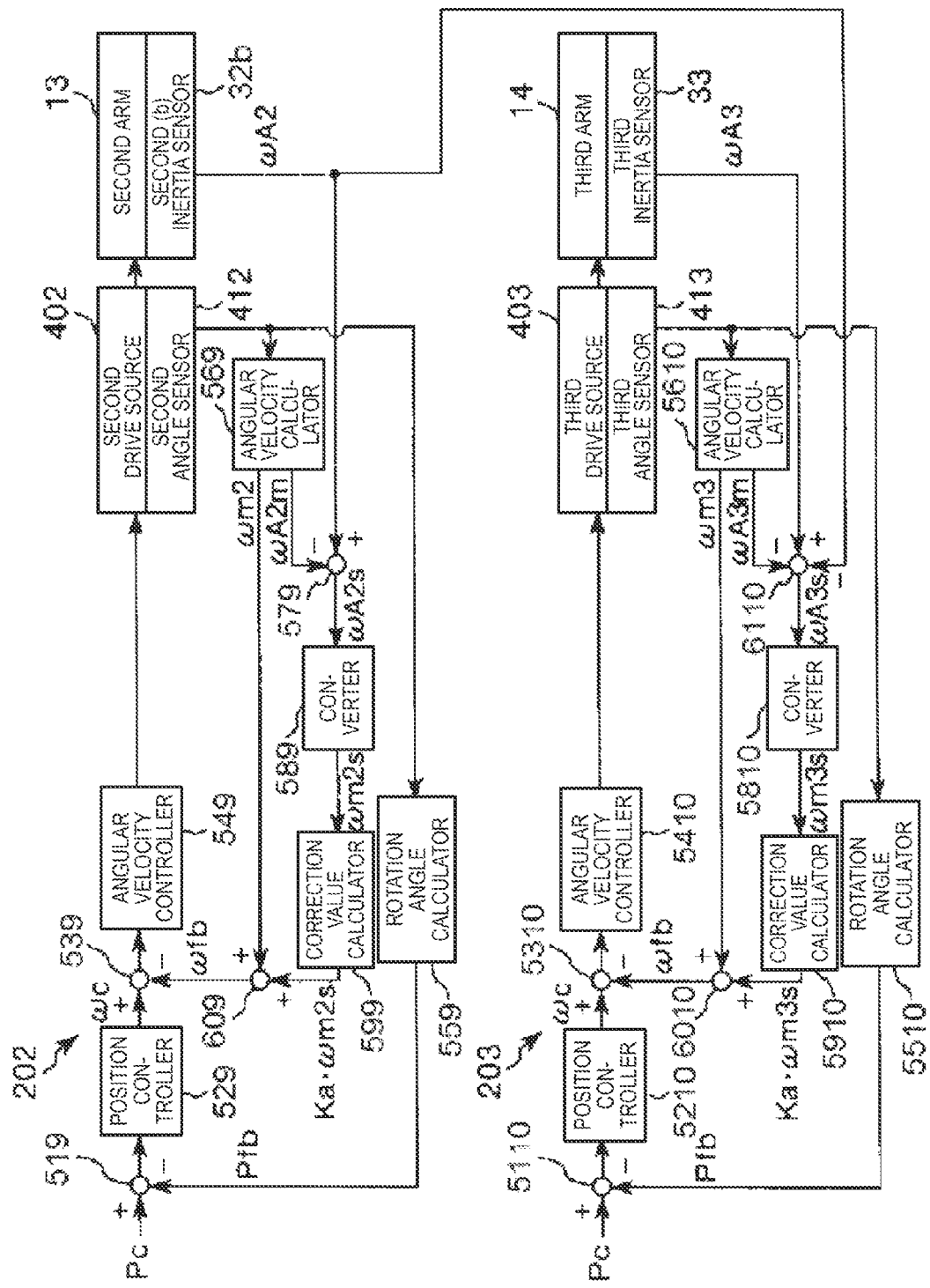
FIG. 17 is a block diagram of main portions of the robot shown in FIG. 16.

FIG. 16 is a schematic view showing a fifth embodiment of the robot of the invention. FIG. 17 is a block diagram of main portions of the robot shown in FIG. 16.

In addition, in the following, for the convenience of description, the upper side in FIG. 16 is referred to as "upper" and "upside" and the lower side is referred to as "lower" and "downside". Additionally, the base side in FIG. 16 is referred to as a "base end", and the opposite side is referred to as a "tip". Additionally, the rotation axes O2 and O3 are shown in an exaggerated manner in FIG. 16, respectively. Additionally, inertia sensors 31, 32*b*, and 33 are shown outside arms 12, 13, 14 in FIG. 16, respectively, in order to clarify the presence of the sensors.

The fifth embodiment will be described below mainly regarding differences from the aforementioned third embodiment, and the description of the same matters will be omitted.

As shown in FIG. 16, in the robot 1 of the fifth embodiment, the third inertia sensor 33 is installed at the third arm 14. The third inertia sensor 33 detects the angular velocity of the third arm 14 around the rotation axis O2. Although the installation position of the third inertia sensor 33 at the third arm 14 is not particularly limited, a tip portion of the third arm 14 is preferable. In the present embodiment, the third inertia sensor 33 is installed at the tip portion inside the third arm 14. Since the vibration in the third arm 14 becomes the maximum at the tip portion of the third arm, this can more reliably suppress the vibration in the robot 1. In addition, it is obvious that the third inertia sensor 33 may be installed at a base end portion of the third arm 14.

Additionally, the third inertia sensor 33 is not particularly limited, and in the present embodiment, for example, a gyroscope sensor or the like can be used.

In the robot 1, in order to suppress the vibration in the first arm 12, the second arm 13, and the third arm 14, the first inertia sensor 31, the second (b) inertia sensor 32*b*, and the third inertia sensor 33 are installed at all the first arm 12, the second arm 13, and the third arm 14 as mentioned above, and the operation of the first drive source 401, the second drive source 402, and the third drive source 403 is controlled on the basis of detection results of the first inertia sensor 31, the second (b) inertia sensor 32*b*, and the third inertia sensor 33. Accordingly, the vibration in the first arm 12, the second arm 13, and the third arm 14 can be reliably suppressed, and thereby, the vibration in the whole robot 1 can be reliably suppressed.

Additionally, in the robot 1, the third drive source controller 203 of the control device 20 is different from that of the third embodiment.

As shown in FIG. 17, the second drive source controller 202 has a subtractor 519, a position controller 529, a subtractor 539, an angular velocity controller 549, a rotation angle calculator 559, an angular velocity calculator 569, a subtractor 579, a converter 589, a correction value calculator 599, and an adder 609.

Additionally, as shown in FIG. 17, the third drive source controller 203 has a subtractor 5110, a position controller 5210, a subtractor 5310, an angular velocity controller 5410, a rotation angle calculator 5510, an angular velocity calculator 5610, an adder-subtractor 6110, a converter 5810, a correction value calculator 5910, and an adder 6010. The third drive source controller 203 will be described below.

As shown in FIG. 17, in addition to a position command Pc of the third drive source 403, detection signals are input from the third angle sensor 413, the second (b) inertia sensor 32*b*, and the third inertia sensor 33, respectively, to the third drive source controller 203. The third drive source controller 203 drives the third drive source 403 by a feedback control using the respective detection signals so that a rotation angle (position feedback value Pfb) of the third drive source 403 calculated from the detection signal of the third angle sensor 413 becomes the position command Pc and an angular velocity feedback value $\omega$fb to be described below becomes an angular velocity command $\omega$c to be described below.

That is, the position command Pc is input to the subtractor 5110 of the third drive source controller 203, and the position feedback value Pfb to be described below is input from the rotation angle calculator 5510. In the rotation angle calculator 5510, the number of pulses input from the third angle sensor 413 is counted, and the rotation angle of the third drive source 403 according to the counted value is output to the subtractor 5110 as the position feedback value Pfb. The subtractor 5110 outputs a deviation (value obtained by subtracting the position feedback value Pfb from a targeted value of the rotation angle of the third drive source 403) between the position command Pc and the position feedback value Pfb to the position controller 5210.

The position controller 5210 performs predetermined calculation processing using the deviation input from the subtractor 5110, a proportional gain that is a predetermined factor, and the like and calculates the targeted value of the angular velocity of the third drive source 403 according to the deviation. The position controller 5210 outputs a signal showing the targeted value (command value) of the angular velocity of the third drive source 403 to the subtractor 5310 as the angular velocity command (third angular velocity command) $\omega$c. In addition, in the present embodiment, a proportional control (P control) is performed as the feedback control. However, the feedback control is not limited to this.

The angular velocity command $\omega$c and the angular velocity feedback value $\omega$fb to be described below are input to the subtractor 5310. The subtractor 5310 outputs a deviation (value obtained by subtracting the angular velocity feedback value $\omega$fb from the targeted value of the angular velocity of the third drive source 403) between the angular velocity command $\omega$c and the angular velocity feedback value $\omega$fb to the angular velocity controller 5410.

The angular velocity controller 5410 performs predetermined calculation processing including integration, using the deviation input from the subtractor 5310, a proportional gain that is a predetermined factor, an integration gain, or the like, thereby generating a driving signal (driving current) of the third drive source 403 according to the deviation and supplying the driving signal to the motor of the third drive source 403 via the motor driver 303. In addition, in the present embodiment, the PI control is performed as the feedback control. However, the feedback control is not limited to this.

In this way, the feedback control is performed and the driving current of the third drive source 403 is controlled so that the position feedback value Pfb is as equal to the position command Pc as possible and the angular velocity feedback value $\omega$fb is as equal to the angular velocity command $\omega$c as possible. In addition, since the rotation axis O3 is orthogonal to the rotation axis O1, the rotation axis O3 is not influenced by the operation or vibration of the first arm 12, and the operation of the third drive source 403 can be controlled independently from the first drive source 401.

Next, the angular velocity feedback value ωfb in the third drive source controller 203 will be described.

In the angular velocity calculator 5610, an angular velocity ωm3 of the third drive source 403 is calculated on the basis of the frequency of a pulse signal input from the third angle sensor 413, and the angular velocity ωm3 is output to the adder 6010.

Additionally, in the angular velocity calculator 5610, an angular velocity ωA3m of the third arm 14 around the rotation axis O3 is calculated on the basis of the frequency of the pulse signal input from the third angle sensor 413, and the angular velocity ωA3m is output to the adder-subtractor 6110. In addition, the angular velocity ωA3m is a value obtained by dividing the angular velocity ωm3 by a reduction ratio between the motor 403M of the third drive source 403 and the third arm 14, that is, in the joint 173.

Additionally, the angular velocity of the third arm 14 around the rotation axis O2 is detected by the third inertia sensor 33. A detection signal of the third inertia sensor 33, that is, an angular velocity ωA3 of the third arm 14 around the rotation axis O2 detected by the third inertia sensor 33 is output to the adder-subtractor 6110. In addition, since the rotation axes O2 and O3 are orthogonal to the rotation axis O1, respectively, the angular velocity of the third arm 14 around the rotation axis O2 can be easily and reliably obtained without being influenced by the operation or vibration of the first arm 12.

Additionally, the detection signal of the aforementioned second (b) inertia sensor 32b, that is, the angular velocity ωA2 of the second arm 13 around the rotation axis O2 detected by the second (b) inertia sensor 32b is output to the adder-subtractor 6110.

The angular velocity ωA3, the angular velocity ωA2, and the angular velocity ωA3m are input to the adder-subtractor 6110, and the adder-subtractor 6110 outputs a value ωA3s (=ωA3−ωA2−ωA3m) obtained by subtracting the angular velocity ωA2 and the angular velocity ωA3m from the angular velocity ωA3 to the converter 5810. The value ωA3s is equivalent to a vibration component (vibration angular velocity) of the angular velocity of the third arm 14 around the rotation axis O3. Hereinafter, ωA3s is referred to as a vibration angular velocity. In the present embodiment, a feedback control is performed in which the vibration angular velocity ωA3s (in detail, an angular velocity ωm3s in the motor 403M that is a value generated on the basis of the vibration angular velocity ωA3s) is multiplied by a gain Ka to be described below and is returned to the input side of the third drive source 403. Specifically, a feedback control is performed on the third drive source 403 so that the vibration angular velocity ωA3s becomes as close to 0 as possible. Accordingly, the vibration in the robot 1 can be suppressed. In addition, the angular velocity of the third drive source 403 is controlled in the feedback control.

The converter 5810 converts the vibration angular velocity ωA3s into the angular velocity ωm3s in the third drive source 403, and outputs the angular velocity ωm3s to the correction value calculator 5910. This conversion can be obtained by multiplying the vibration angular velocity ωA3s by the reduction ratio between the motor 403M of the third drive source 403 and the third arm 14, that is, in the joint 173.

The correction value calculator 5910 multiplies the angular velocity ωm3s by a gain (feedback gain) Ka that is a predetermined factor, obtains a correction value (third correction component) Ka·ωm3s, and outputs the correction value Ka·ωm3s to the adder 6010. In addition, the gain Ka in the third drive source controller 203, the gain Ka in the first drive source controller 201, and the gain Ka in the second drive source controller 202 may be the same or may be different, respectively.

The angular velocity ωm3 and the correction value Ka·ωm3s are input to the adder 6010. The adder 6010 outputs an additional value of the angular velocity ωm3 and the correction value Ka·ωm3s to the subtractor 5310 as the angular velocity feedback value ωfb. In addition, the subsequent operation is the same as that of the third embodiment.

According to the robot 1, the same effects as the aforementioned first embodiment are obtained.

In the robot 1, since the control of suppressing vibration is also performed on the third arm 14, the vibration in the robot 1 can be more reliably suppressed.

Although the above robot of the invention has been described on the basis of the illustrated embodiments, the invention is not limited to this, and the configurations of the respective portions can be replaced with arbitrary configurations having the same functions. Additionally, other arbitrary structures may be added to the invention.

Additionally, the invention may be provided from the combination of two or more arbitrary configurations (features) among the respective embodiments.

In addition, the respective motors include, for example, stepping motors or the like in addition to the servo motors, respectively.

Additionally, in the above embodiments, the encoders are used as the respective angle sensors, respectively. However, the invention is not limited to these. For example, other various sensors, such as resolvers or potentiometers, which detect the rotation angles of rotor of the motors, may be used, and various sensors, such as tachogenerators, which detect the rotating speed of the rotors of the motors, may be used. In addition, when the stepping motors are used as the motor, the rotation angle or rotating speed of the rotors of the motors may be detected, for example, by measuring the number of driving pulses input to the stepping motors.

Additionally, in the above embodiments, the gyroscope sensors are used as the respective inertia sensors, respectively. However, the invention is not limited to these. For example, other various angular velocity sensors that detect the angular velocity of the arms may be used, and various acceleration sensors that detect the acceleration of the arms may be used. In addition, when the acceleration sensors are used, angular velocity is calculated using the detection values of the acceleration sensors.

Additionally, the types of the respective angle sensors and the respective inertia sensors are not particularly limited, and include, for example, an optical type, a magnetic type, an electromagnetic type, an electric type, or the like.

Additionally, in the above embodiments, the number of rotation axes of the robot is six. However, the invention is not limited to this, and the number of rotation axes of the robot may be two, three, four, five, or seven or more.

That is, in the above embodiments, the number of arms of the robot is six because the wrist has two arms. However, the invention is not limited to this, and the number of arms of the robot may be two, three, four, five, or seven or more.

Figure 18:
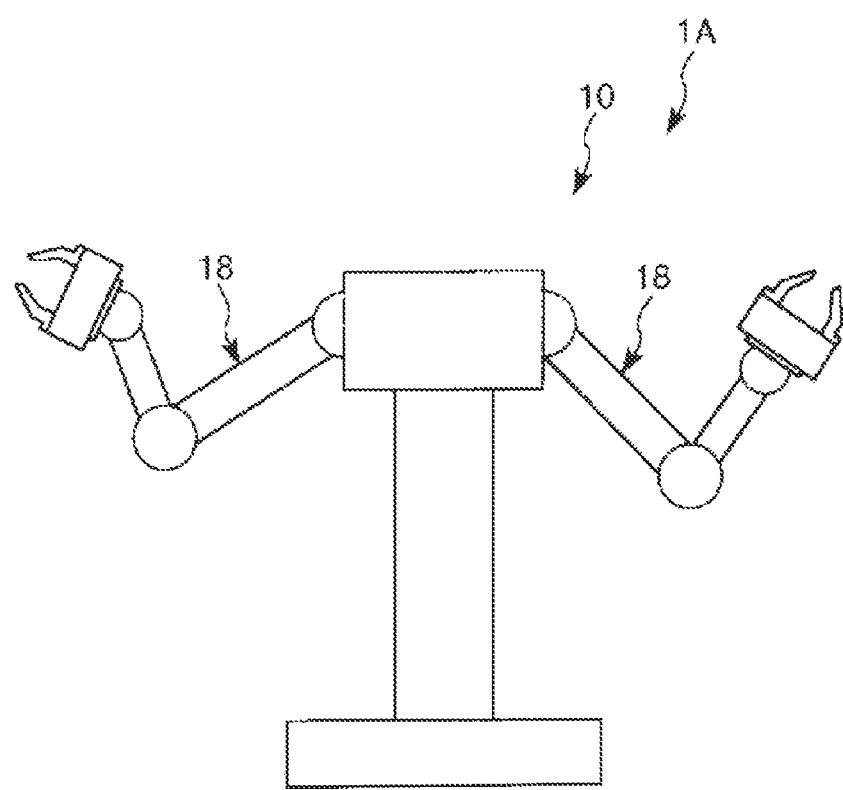
FIG. 18 is a front view showing another configuration example of the robot of the invention.

Additionally, in the above embodiments, the robot is a single arm robot that has one arm coupling body obtained by rotatably coupling a plurality of arms. However, the invention is not limited to this. For example, as shown in FIG. 18, robots having a plurality of the arm coupling bodies, such as a double-arm robot 1A having the two arm coupling bodies 18 each obtained by rotatably coupling a plurality of arms, may be used.

Additionally, in the above embodiments, the manipulator is detachably mounted on the wrist as the functional portion. However, the invention is not limited to this, and the functional portion (end effector) includes a drill, a welder, a laser irradiation machine, or the like in addition to this manipulator.

Additionally, in the above embodiments, those including the angle detection unit that detects the angle θ formed between the axis of the first present arm and the axis of the second arm or the angle detection unit that detects the angle θ between the axis of the second present arm and the axis of the third arm is used as the posture detection unit. However, the invention is not limited to this. Besides, the posture detection unit includes a unit that acquires the targeted values (command values) of the rotation angle of the drive sources. The posture detection unit, for example, obtains an angle θ in the following control cycle on the basis of the targeted value of the rotation angle of a drive source in the following control cycle and the current angle θ. In this case, the feedback gain Ka is set to a predetermined value on the basis of the angle θ in the following control cycle.

Additionally, for example, the feedback gain Ka may be adjusted on the basis of the current position of a tip portion of an arm, the command value of the position of the tip portion of the arm in the following control cycle, the current position of the tip portion of the wrist of the robot that is an arm closest to the tip side, the command value of the position of the tip portion of the wrist in the following control cycle, or the like.

The entire disclosure of Japanese Patent Application No. 2012-191451 filed Aug. 31, 2012 is expressly incorporated by reference herein.

What is claimed is:

1. A robot comprising:
a base;
a first arm that is coupled to the base and rotates with a first rotation axis as an axial center;
a second arm that is coupled to the first arm and rotates with a second rotation axis in a direction different from the first rotation axis as an axial center;
a third arm that rotates with a third rotation axis in a direction parallel to the second rotation axis as an axial center;
a first drive source that rotates the first arm through a first angular velocity command;
a first inertia sensor that is installed at the first arm and detects a first angular velocity or acceleration of the first rotation axis of the first arm;
a first angle sensor that detects a rotation angle of the first drive source;
a second drive source that rotates the second arm through a second angular velocity command;
a second angle sensor that detects a rotation angle of the second drive source;
a third drive source that rotates the third arm through a third angular velocity command;
a second inertia sensor that is installed at the third arm and detects a second angular velocity or acceleration of the second rotation axis of the third arm;
a third angle sensor that detects a rotation angle of the third drive source;
a posture detection unit that detects a posture of the third arm with the second arm as a reference and derives a feedback gain;
a first drive source control unit that feeds back a first correction component that is derived from the first angular velocity of the first rotation axis of the first arm obtained from the first inertia sensor and a third angular velocity of the first rotation axis of the first arm based on the rotation angle from the first angle sensor, and controls the first drive source; and
a second drive source control unit that feeds back a second correction component that is obtained by multiplying a vibration component value by the feedback gain, and controls the second drive source, wherein the vibration component value is derived from the second angular velocity, a fourth angular velocity of the second rotation axis of the second arm, and a fifth angular velocity of the third rotation axis of the third arm, wherein the fourth angular velocity is based on the rotation angle from the second angle sensor and the fifth angular velocity is based on the rotation angle from the third angle sensor.

2. The robot according to claim 1, wherein:
the first correction component is obtained by multiplying a value, which is obtained by subtracting the third angular velocity from the first angular velocity, or a value derived from the obtained value, by a feedback gain, and controls the first drive source.

3. The robot according to claim 1, wherein:
the posture detection unit includes the third angle sensor and detects an angle formed between the axis of the second arm and the axis of the third arm.

4. The robot according to claim 1, wherein:
the posture detection unit detects an angle formed between the axis of the second arm and the axis of the third arm, and increases the feedback gain as the angle approaches 180°.

5. The robot according to claim 1, wherein:
the posture detection unit adjusts the feedback gain, on the basis of the mass of an end effector or the mass of the end effector and an object to be gripped by the end effector.

6. The robot according to claim 1, wherein:
the posture detection unit decreases the feedback gain as the mass becomes larger.

7. The robot according to claim 1, wherein:
the first inertia sensor is installed at a tip portion of the first arm; and
the second inertia sensor is installed at a tip portion of the third arm.

8. The robot according to claim 1, wherein:
the first arm rotates with the first rotation axis that coincides with a normal line of an installation surface of the base, as an axial center.

9. The robot according to claim 1, wherein:
the second arm rotates with the second rotation axis that is orthogonal to the first rotation axis or parallel to an axis orthogonal to the first rotation axis, as an axial center.

* * * * *